United States Patent
Lee et al.

(10) Patent No.: US 8,044,566 B2
(45) Date of Patent: Oct. 25, 2011

(54) FLUORESCENT MIXTURE FOR FLUORESCENT LAMP, FLUORESCENT LAMP, BACKLIGHT ASSEMBLY HAVING THE SAME AND DISPLAY DEVICE HAVING THE SAME

(75) Inventors: Dong-Chin Lee, Cheonan-si (KR); Seok-Hyun Nam, Seoul (KR); Seon-Bae Kim, Asan-si (KR); Sang-Hyuck Yoon, Seoul (KR); Hyun-Jin Kim, Yongin-si (KR); Kyung-Min Kim, Asan-si (KR); So-Jin Ryu, Seoul (KR); Min-Jeong Wang, Seoul (KR); Hee-Tae Kim, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 311 days.

(21) Appl. No.: 12/233,855

(22) Filed: Sep. 19, 2008

(65) Prior Publication Data
US 2009/0174307 A1 Jul. 9, 2009

(30) Foreign Application Priority Data

Jan. 7, 2008 (KR) .................. 10-2008-0001614
Mar. 13, 2008 (KR) .................. 10-2008-0023357

(51) Int. Cl.
*H01J 5/16* (2006.01)
*H01J 1/62* (2006.01)

(52) U.S. Cl. .......................... 313/486; 313/487
(58) Field of Classification Search .......... 313/486–487; 252/301.4 P, 301.4 R
See application file for complete search history.

(56) References Cited

U.S. PATENT DOCUMENTS

| | | | | |
|---|---|---|---|---|
| 6,137,217 | A * | 10/2000 | Pappalardo et al. | .......... 313/487 |
| 6,414,426 | B1 | 7/2002 | Akashi et al. | |
| 2002/0053868 | A1 | 5/2002 | Shimizu et al. | |
| 2007/0058105 | A1 * | 3/2007 | Igarashi et al. | .................. 349/70 |

FOREIGN PATENT DOCUMENTS

| | | |
|---|---|---|
| EP | 0993022 | 4/2000 |
| EP | 1593944 | 11/2005 |
| JP | 05-230454 | 9/1991 |
| KR | 1020000042740 | 7/2000 |
| KR | 1020060032080 | 4/2006 |

OTHER PUBLICATIONS

European Search Report dated Jun. 8, 2009.

* cited by examiner

*Primary Examiner* — Karabi Guharay
(74) *Attorney, Agent, or Firm* — F. Chau & Associates, LLC

(57) ABSTRACT

A fluorescent lamp includes a lamp body, a fluorescent layer and a discharge electrode. The lamp body has a discharge space in which ultraviolet light is generated. The fluorescent layer is formed on an inner surface of the lamp body to change the ultraviolet light into visible light. The discharge electrode is on an end portion of the lamp body to apply a voltage to the discharge space. A ratio of intensities of the visible light at wavelengths of about 545 nm and about 516 nm is about 1.32:1 to about 1.71:1. Therefore, color reproducibility and luminance may be improved.

10 Claims, 15 Drawing Sheets

FLUORESCENT MIXTURE FOR FLUORESCENT LAMP, FLUORESCENT LAMP, BACKLIGHT ASSEMBLY HAVING THE SAME AND DISPLAY DEVICE HAVING THE SAME

CROSS-REFERENCE TO RELATED APPLICATIONS

The present application claims priority to Korean Patent Application No. 2008-1614, filed on Jan. 7, 2008, and Korean Patent Application No. 2008-23357, filed on Mar. 13, 2008, the contents of which are each hereby incorporated by reference herein in their entireties.

BACKGROUND OF THE INVENTION

1. Technical Field

The present disclosure relates to a fluorescent mixture, a fluorescent lamp, a backlight assembly having the fluorescent lamp and a display device having the fluorescent lamp. More particularly, the present disclosure relates to a fluorescent mixture, a fluorescent lamp used for a display device, a backlight assembly having the fluorescent lamp and a display device having the fluorescent lamp.

2. Description of the Related Art

Liquid crystal display (LCD) devices typically have various characteristics such as, for example, thin thickness, light weight, low deriving voltage, low power consumption. Thus, LCD devices are widely used in various fields.

An LCD panel of an LCD device is a non-emissive type display device that does not generate light. Thus, the LCD device includes a backlight assembly that supplies the LCD panel with light.

The backlight includes, for example, a cold cathode fluorescent lamp (CCFL), an external electrode fluorescent lamp (EEFL), a flat fluorescent lamp (FFL), a light emitting diode (LED) as a light source. The fluorescent lamp has various characteristics such as, for example, low price, long lifetime, and low heat generation, and therefore the fluorescent lamp is widely used in the LCD device having various sizes.

The fluorescent lamp may include, for example, an electrode, a discharge space filled with a discharge gas, and a fluorescent lamp. When a discharge voltage is applied to the electrode, the discharge gas in the discharge space may generate excitons. Moreover, when ultraviolet light generated by the excitons is incident into the fluorescent layer, visible light may be generated from the fluorescent layer.

The fluorescent layer includes a fluorescent material. Optical characteristics such as, for example, luminance, color, color reproducibility of the visible light may be changed based on the kind of the fluorescent material. The color reproducibility is a reference for determining a color displayed on the LCD device. The color reproducibility may be represented by the CIE1976 color coordinate system, the NTSC color coordinate system, and may be a percentage of a color range with respect to the above-mentioned color coordinates. However, when the fluorescent material has high color reproducibility, the luminance of the visible light may be decreased. When the fluorescent material has high luminance, the color reproducibility of the visible light may be decreased.

Also, the visible light may include red color, green color and blue color, and one of the red, green and blue colors may deteriorate luminance or color reproducibility of the remainder of the red, green and blue colors. For example, wavelength distribution of the green light may be irregular, so that the color reproducibility of the blue color may be deteriorated.

SUMMARY OF THE INVENTION

Exemplary embodiments of the present invention may provide a fluorescent mixture for a fluorescent lamp, which is capable of improving luminance and color reproducibility.

Exemplary embodiments of the present invention may also provide a fluorescent lamp for a display device, which is capable of improving luminance and color reproducibility.

Exemplary embodiments of the present invention may also provide a backlight assembly including the above-mentioned fluorescent lamp.

Exemplary embodiments of the present invention further may also provide a display device including the above-mentioned fluorescent lamp.

In accordance with an exemplary embodiment of the present invention, a fluorescent mixture is provided. The fluorescent mixture includes $(Sr,Ca,Ba,Mg)_5(PO_4)_3Cl:Eu^{2+}$ (SCA), $Y_2O_3:Eu^{3+}$ (YOX), and $(Ce,Mg,Zn)Al_{11}O_{19}:Mn^{2+}$ (CMZ). The SCA may be present in an amount of about 45 to about 50 wt %, the YOX may be present in an amount of about 29 to about 33 wt %, and the CMZ may be present in an amount of about 20 to about 26 wt %.

In accordance with another exemplary embodiment of the present invention, a fluorescent lamp is provided. The fluorescent lamp includes a lamp body, a fluorescent layer and a discharge electrode. The lamp body has a discharge space in which ultraviolet light is generated. The fluorescent layer is formed on an inner surface of the lamp body to change the ultraviolet light into visible light. The fluorescent layer includes a fluorescent mixture comprising $(Sr,Ca,Ba,Mg)_5(PO_4)_3Cl:Eu^{2+}$ (SCA), $Y_2O_3:Eu^{3+}$ (YOX), and $(Ce,Mg,Zn)Al_{11}O_{19}:Mn_{2+}$ (CMZ). The discharge electrode is on an end portion of the lamp body to apply a voltage to the discharge space.

The ratio of intensities of the visible light at wavelengths of about 445 nm and about 517 nm may be about 1:0.40 to about 1:0.50. A ratio of intensities of the visible light at wavelengths of about 445 nm and about 612 nm may be about 1:1.50 to about 1:1.60. The ratio of the intensities of the visible light at the wavelengths of about 445 nm, about 517 nm and about 612 nm may be about 1:0.46:1.55.

The fluorescent mixture may include the SCA present in an amount of about 45 to about 50 wt %, the YOX present in an amount of about 29 to about 33 wt %, and the CMZ present in an amount of about 20 to about 26 wt %. The fluorescent mixture may also include the SCA present in an amount of about 47 wt %, the YOX present in amount of about 31 wt % and the CMZ present in an amount of about 22 wt %.

In accordance with another exemplary embodiment of the present invention, a fluorescent lamp is provided. The fluorescent lamp includes a lamp body, a fluorescent layer and a discharge electrode.

The lamp body has a discharge space in which ultraviolet light is generated. The fluorescent layer is formed on an inner surface of the lamp body to change the ultraviolet light into visible light. The discharge electrode is on an end portion of the lamp body to apply a voltage to the discharge space. The ratio of intensities of the visible light at wavelengths of about 545 nm and about 516 nm is about 1.32:1 to about 1.71:1.

The ratio of intensities of the visible light at wavelengths of about 545 nm and about 516 nm may be about 1.32:1 to about 1.53:1. The ratio of intensities of the visible light at wavelengths of about 516 nm and about 579 nm may be about 1:0.25 to about 1:0.27. The ratio of the intensities of the visible light at the wavelengths of about 545 nm, about 516 nm and about 579 nm may be about 1.53:1:0.26.

The fluorescent layer may comprise a green fluorescent mixture including a main green fluorescent material present in an amount of about 65 to about 85 wt %, a first auxiliary green fluorescent material present in an amount of about 10 to about 20 wt %, and a second auxiliary green fluorescent material present in an amount of about 5 to about 15 wt %. The first auxiliary green fluorescent material generates light may have lower color reproducibility and higher luminance than the main green fluorescent material, and the second auxiliary green fluorescent material generates light may have higher color reproducibility and lower luminance than the main green fluorescent material. The main green fluorescent material may include $BaMgAl_{10}O_{17}:Eu^{2+},Mn^{2+}$. The first auxiliary green fluorescent material may comprise $LaPO_4:Ce^{3+},Tb^{3+}$. The second auxiliary green fluorescent material may comprise a green fluorescent material selected from the group consisting of $(Ce,Mg,Zn)Al_{11}O_{19}:Mn^{2+}$ and $BaMgAl_{14}O2_3:Mn^{2+}$. For example, the second auxiliary green fluorescent material may comprise $(Ce,Mg,Zn)Al_{11}O_{19}:Mn^{2+}$.

The main green fluorescent material may be about 75 wt %, the first auxiliary green fluorescent material is about 15 wt %, and the second auxiliary green fluorescent material is about 10 wt %.

The fluorescent layer may comprise a red fluorescent material selected from the group consisting of $Y_2O_3:Eu^{3+}$, $Y(P,V)O_4:Eu^{3+}$, $3.5MgO.0.5MgF_2.GeO_2:Mn^{4+}$, $(Y,Gd)BO_3:Eu^{3+}$, $YVO_4:Eu^{3+}$, $(Ce,Gd)MgB_5O_{10}:Mn^{2+}$ and $Y_2O_2S:Eu^{3+}$. The fluorescent layer may comprise a red fluorescent material selected from the group consisting of $Sr_5(PO_4)_3Cl:Eu^{2+}$, $BaMgAl_{10}O_{17}:Eu^{2+}$, $Sr_2Al_6O_{11}:Eu^{2+}$, $Ba\ Al_8O_{13}:Eu^{2+}$, $CaMdSi_2O_6:Eu^{2+}$, $(Sr,Ca,Ba,Mg)_5(PO_4)_3Cl:Eu^{2+}$ and $Sr_4Al_{14}O_{25}:Eu^{2+}$.

In accordance with an exemplary embodiment of the present invention, a backlight assembly is provided. The backlight assembly includes a fluorescent lamp, an optical member and a receiving container.

The fluorescent lamp includes a lamp body, a fluorescent layer and a discharge electrode. The lamp body has a discharge space in which ultraviolet light is generated. The fluorescent layer is formed on an inner surface of the lamp body to change the ultraviolet light into visible light. The ratio of intensities of the visible light at wavelengths of about 516 nm and about 579 nm is about 1:0.25 to about 1:0.27. The discharge electrode is on an end portion of the lamp body to apply a voltage to the discharge space. The optical member is adjacent to the fluorescent lamp to improve optical characteristics of the visible light. The receiving container receives the fluorescent lamp and the fluorescent member.

In accordance with another exemplary embodiment of the present invention, a display device is provided. The display device includes a fluorescent lamp, an optical member, a receiving container and a display panel.

The fluorescent lamp includes a lamp body, a fluorescent layer and a discharge electrode. The lamp body has a discharge space in which ultraviolet light is generated. The fluorescent layer is formed on an inner surface of the lamp body to change the ultraviolet light into visible light. The ratio of intensities of the visible light at wavelengths of about 545 nm and about 516 nm is about 1.32:1 to about 1.71:1. The discharge electrode is on an end portion of the lamp body to apply a voltage to the discharge space. The optical member is adjacent to the fluorescent lamp to improve optical characteristics of the visible light. The receiving container receives the fluorescent lamp and the fluorescent member. The display panel is disposed on the optical member to display an image using the light having passed through the optical member.

In accordance with an exemplary embodiment of the present invention, a display device is provided. The display device includes a fluorescent lamp, an optical member and a display panel. The fluorescent lamp includes a lamp body, a fluorescent layer and a discharge electrode. The lamp body has a discharge space in which ultraviolet light is generated. The fluorescent layer is formed on an inner surface of the lamp body to change the ultraviolet light into visible light. The fluorescent layer includes a fluorescent mixture comprising $(Sr,Ca,Ba,Mg)_5(PO_4)_3Cl:Eu^{2+}$(SCA), $Y_2O_3:Eu^{3+}$(YOX), and $(Ce,Mg,Zn)Al_{11}O_{19}:Mn^{2+}$(CMZ). The discharge electrode is on an end portion of the lamp body to apply a voltage to the discharge space. The optical member is adjacent to the fluorescent lamp to improve optical characteristics of the visible light. The display panel is disposed on the optical member and includes a plurality of color filters transmitting the light having passed through the optical member to display an image.

The ratio of intensities of the visible light at wavelengths of about 445 nm, about 517 nm and about 612 nm may be about 1:0.46:1.55. The color filters may comprise a red color filter generating red light, a green color filter generating green light, and a blue color filter generating blue light. The ratio of intensities of the red light having passed through the red color filter at wavelengths of about 445 nm and 513 nm may be about 1:0.13 to about 1:0.14. Color coordinates of the blue light may be about (0.23, 0.67) to about (0.24, 0.68) in the CIE1931 color coordinate system. The color coordinates of white light generated by mixing the red, green and blue lights may be about (0.29, 0.29) to about (0.30, 0.30) in the CIE1931 color coordinate system.

The display panel may include an array substrate, an opposite substrate facing the array substrate and a liquid crystal layer interposed between the array substrate and the opposite substrate.

The fluorescent lamp may include a cold cathode fluorescent lamp, an external electrode fluorescent lamp, a flat type fluorescent lamp, etc.

In accordance with exemplary embodiments of the present invention, a fluorescent lamp, a backlight assembly having the fluorescent lamp and a display device having the fluorescent lamp, the fluorescent lamp, in which green light is a critical color of luminance compared with red light or blue light, includes a fluorescent layer having a main green fluorescent material, a first sub-green fluorescent material and a second sub-green fluorescent material. Thus, the luminance of the fluorescent lamp may be increased, although color reproducibility may not be decreased. In addition, the ratio between the main green fluorescent material, the first sub-green fluorescent material and the second sub-green fluorescent material is adjusted to optimize the color reproducibility and luminance of the backlight assembly.

Furthermore, the green light generated from the green fluorescent mixture may not emit light having a blue wavelength, so that the color reproducibility of the blue light may not be deteriorated.

CMZ may be used for the green fluorescent material, so that color purity of the light generated from the green fluorescent material may be improved.

Also, disturbance between the light generated from the green fluorescent material and the blue light or between the light generated from the green fluorescent material and the red light may be decreased, so that color purity of the green light or the red light that has similar wavelength range as the light generated from the green fluorescent material may be improved. Thus, the color reproducibility and the image display quality of the display device may be improved.

BRIEF DESCRIPTION OF THE DRAWINGS

Exemplary embodiments of the present invention can be understood in more detail from the accompanying drawings, in which.

DESCRIPTION OF THE EXEMPLARY EMBODIMENTS OF THE INVENTION

Figure 1:
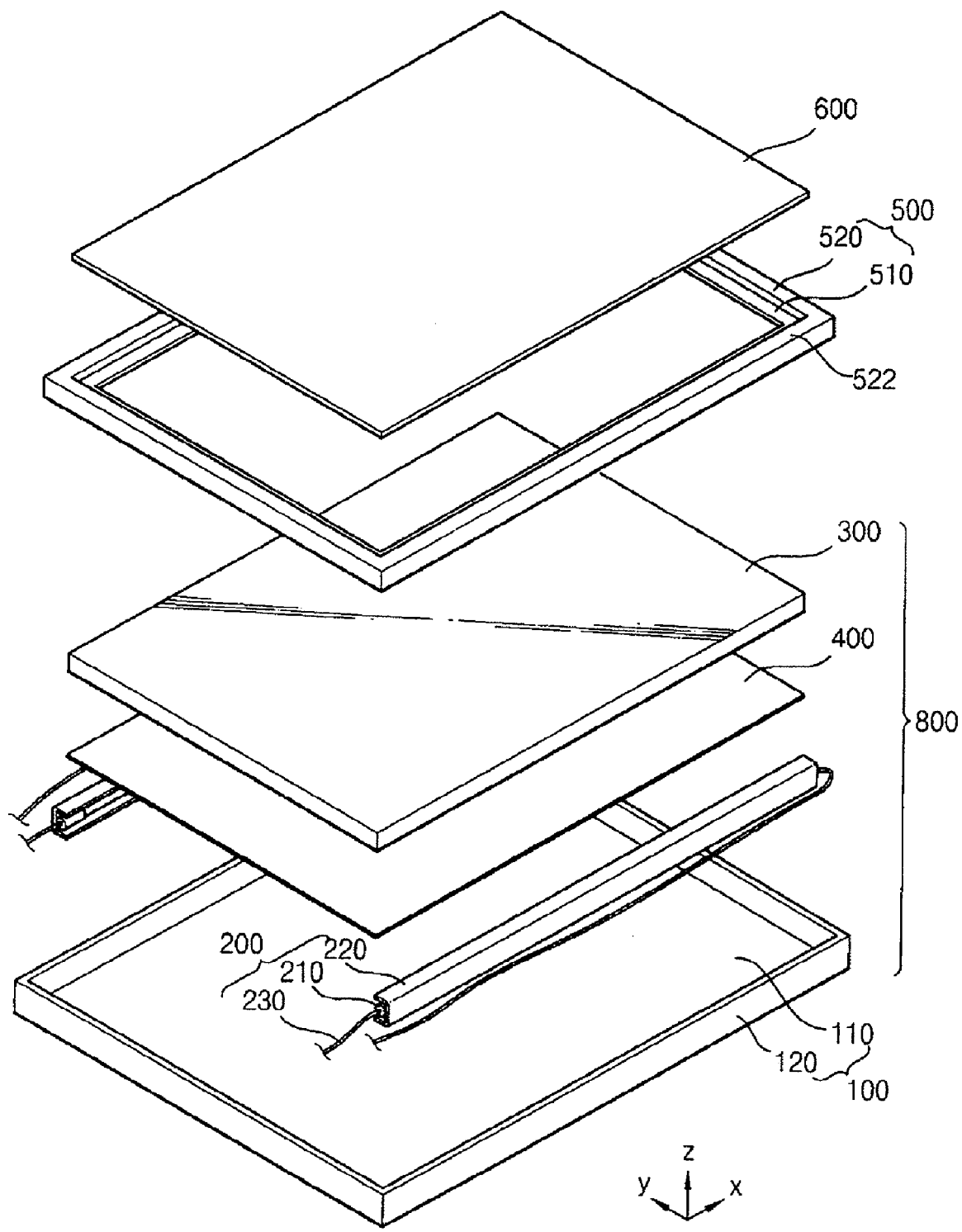
FIG. 1 is an exploded perspective view illustrating a display device in accordance with an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

Green Fluorescent Mixture

Green fluorescent mixture includes a main green fluorescent material of about 65 to about 85 wt %, a first auxiliary green fluorescent material of about 10 to about 20 wt %, and a second auxiliary green fluorescent material of about 5 to about 15 wt %. The first auxiliary green fluorescent material generates light having lower color reproducibility and higher luminance than the main green fluorescent material. The second auxiliary green fluorescent material generates light having higher color reproducibility and lower luminance than the main green fluorescent material.

When the main green fluorescent material is less than about 65 wt % and the first auxiliary green fluorescent material is more than about 20 wt %, the color reproducibility of green light is decreased. When the main green fluorescent material is more than about 85 wt % and the first auxiliary green fluorescent material is less than about 10 wt %, the luminance of the green light is decreased.

When the second auxiliary green fluorescent material is less than about 5 wt %, the color reproducibility of blue light is decreased. When the second auxiliary green fluorescent material is more than about 15 wt %, the luminance of the green light is decreased.

For example, the main green fluorescent material includes $BaMgAl_{10}O_{17}:Eu^{2+},Mn^{2+}$ (BAM:Mn), and the first auxiliary green fluorescent material includes $(Ce,Mg,Zn)Al_{11}O_{19}:Mn^{2+}$ (CMZ). Also, the second auxiliary green fluorescent material may include, for example, $LaPO_4:Ce^{3+},Tb^{3+}$ (LAP). For example, the main green fluorescent material may be about 75 wt %, and the first auxiliary green fluorescent material may be about 10 wt %. The second auxiliary green fluorescent material may be about 15 wt %.

Alternatively, the main green fluorescent material may include, for example, $(Ba,Sr)MgAl_{10}O_{17}:Eu^{2+},Mn^{2+}$ or $BaMgAl_{14}O_{23}:Mn^{2+}$. Also, the green fluorescent mixture may further include, for example, $CeMgAl_{11}O_{15}:Tb^{3+}$ (CAT), $(Ce,Gd)MgB_5O_{10}:Tb^{3+}$ (CBT), $(Y,Gd)BO_3:Tb^{3+}$ (YBT), etc.

The main green fluorescent material, the first auxiliary green fluorescent material and the second auxiliary green fluorescent material may include, for example, BAM:Mn, LAP and CMZ, respectively. Alternatively, the main green fluorescent material, the first auxiliary green fluorescent material and the second auxiliary green fluorescent material may include, for example, various green fluorescent materials. For example, the main green fluorescent material may include $(Ba,Sr)MgAl_{10}O_{17}:Eu^{2+},Mn^{2+}$, and the first auxiliary green fluorescent material may include CAT, YBT, etc. Also, the second auxiliary green fluorescent material may include, for example, $BaMgAl_{14}O_{23}:Mn^{2+}$.

Table 1 represents optical characteristics of green fluorescent materials that may be used for the green fluorescent mixture.

TABLE 1

| green fluorescent material | peak wavelength | color | luminance | color reproducibility | lifetime |
|---|---|---|---|---|---|
| BAM:Mn | 515 | green | ○ | △ | △ |
| CMZ | 518 | green | △ | ○ | △ |
| LAP | 545 | green | ○ | X | ○ |
| CAT | 545 | green | ○ | X | ○ |
| CBT | 545 | green | △ | X | △ |
| YBT | 545 | green | ○ | X | ○ |
| $(Ba, Sr)MgAl_{10}O_{17}:Eu^{2+}, Mn^{2+}$ | 515 | green | ○ | □ | □ |
| $BaMgAl_{14}O_{23}:Mn^{2+}$ | 518 | green | X | ○ | □ |

Referring to Table 1, when ultraviolet light is irradiated onto BAM:Mn, a wavelength of a peak of the green light generated from BAM:Mn is about 515 nm, luminance is good, and color reproducibility and lifetime are normal. When ultraviolet light is irradiated onto CMZ, a wavelength of a peak of the green light generated from CMZ is about 518 nm, color reproducibility is good, and luminance and lifetime are normal. When ultraviolet light is irradiated onto LAP, a wavelength of a peak of the green light generated from LAP is about 545 nm, luminance and lifetime are good, and color reproducibility is poor. When ultraviolet light is irradiated onto CAT, a wavelength of a peak of the green light generated from CAT is about 545 nm, luminance and lifetime are good, and color reproducibility is poor. When ultraviolet light is irradiated onto CBT, a wavelength of a peak of the green light generated from CBT is about 545 nm, luminance and lifetime are normal, and color reproducibility is poor. When ultraviolet light is irradiated onto YBT, a wavelength of a peak of the green light generated from YBT is about 545 nm, luminance and lifetime are good, and color reproducibility is poor. When ultraviolet light is irradiated onto $(Ba,Sr)MgAl_{10}O_{17}:Eu^{2+}, Mn^{2+}$, a wavelength of a peak of the green light generated from $(Ba,Sr)MgAl_{10}O_{17}:Eu^{2+},Mn^{2+}$ is about 515 nm, luminance is good, and color reproducibility and lifetime are normal. When ultraviolet light is irradiated onto $BaMgAl_{14}O2_3:Mn^{2+}$, a wavelength of a peak of the green light generated from $BaMgAl_{14}O2_3:Mn^{2+}$ is about 518 nm, color reproducibility is good, lifetime is normal, and luminance is poor.

The color reproducibility of the cold cathode fluorescent lamp including each of the green fluorescent materials alternates against the luminance of the cold cathode fluorescent lamp including the green fluorescent material. For example, the green fluorescent material of the good color reproducibility has poor or normal luminance. The green fluorescent material of the good luminance has poor or normal color reproducibility.

Method of Manufacturing Green Fluorescent Mixture for Display Device

In the method of manufacturing the green fluorescent mixture for the display device of the present invention, a green fluorescent mixture including a main green fluorescent material of about 65 to about 85 wt %, a first auxiliary green fluorescent material of about 10 to about 20 wt %, and a second auxiliary green fluorescent material of about 5 to about 15 wt % is prepared. The light generated from the first auxiliary green fluorescent material has lower color reproducibility and higher luminance than the light generated from the main green fluorescent material. The light generated from the second auxiliary green fluorescent material has higher color reproducibility and lower luminance than the light generated from the main green fluorescent material.

The main green fluorescent material, the first auxiliary green fluorescent material and the second auxiliary green fluorescent material may be mixed using, for example, an agitator, a mixer, a circulator, etc.

Fluorescent Mixture for Display Device

The fluorescent mixture of the present invention includes a red fluorescent material, a green fluorescent material and a blue fluorescent material.

The red fluorescent material may include, for example, $(Sr,Ca,Ba,Mg)_5(PO_4)_3Cl:Eu^{2+}(SCA)$.

When the SCA is less than about 45 wt %, luminance of red light is decreased, thereby decreasing color reproducibility. When the SCA is more than about 50 wt %, the luminance of the red light is increased and green light is disturbed, thereby decreasing color reproducibility. Thus, the fluorescent mixture of the present invention may include the red fluorescent material of about 45 to about 50 wt %. Preferably, the red fluorescent material may be about 47 to about 50 wt %. For example, the red fluorescent material may be about 47 wt %.

The blue fluorescent material may include, for example, $Y_2O_3:Eu^{3+}(YOX)$.

When the YOX is less than about 29 wt %, luminance of blue light is decreased, thereby decreasing color reproducibility. When the YOX is more than about 33 wt %, the luminance of the blue light is increased, but luminance of the red and green lights is decreased, thereby decreasing color reproducibility. Thus, the fluorescent mixture of the present invention may include the blue fluorescent material of about 29 to about 33 wt %. Preferably, the blue fluorescent material may be about 30 to about 33 wt %. For example, the blue fluorescent material may be about 31 wt %.

The green fluorescent material may include, for example, $(Ce,Mg,Zn)Al_{11}O_{19}:Mn^{2+}(CMZ)$.

When the CMZ is less than about 20 wt %, luminance of green light is decreased, thereby decreasing color reproducibility. When the CMZ is more than about 26 wt %, the luminance of the green light is increased, but the red light is disturbed, thereby decreasing color reproducibility. Thus, the fluorescent mixture of the present invention may include the green fluorescent material of about 20 to about 26 wt %. Preferably, the green fluorescent material may be about 20 to about 25 wt %. For example, the green fluorescent material may be about 22 wt %.

To prepare the fluorescent mixture, the SCA of about 45 to about 50 wt %, the YOX of about 29 to about 33 wt %, and the CMZ of about 20 to about 26 wt % are mixed using, for example, an agitator, a mixer, a circulator, etc.

Display Device

FIG. 1 is an exploded perspective view illustrating a display device in accordance with an exemplary embodiment of the present invention.

Referring to FIG. 1, the display device includes a backlight assembly 800, a mold frame 500 and a liquid crystal display (LCD) panel 600.

The backlight assembly 800 includes a receiving container 100, a light source module 200, a light guiding plate 300 and a reflecting plate 400. The backlight assembly 800 supplies the LCD panel 600 with light through an opening formed through the mold frame 500.

The receiving container 100 includes a bottom plate 110 and a sidewall 120. The sidewall 120 is protruded from sides of the bottom plate 110 to form a receiving space.

The light source module 200 is received in the receiving space of the receiving container 100 adjacent to the sidewall 120.

The light source module 200 includes a cold cathode fluorescent lamp (CCFL) 210, a lamp cover 220 and a lamp wire 230.

Figure 2:
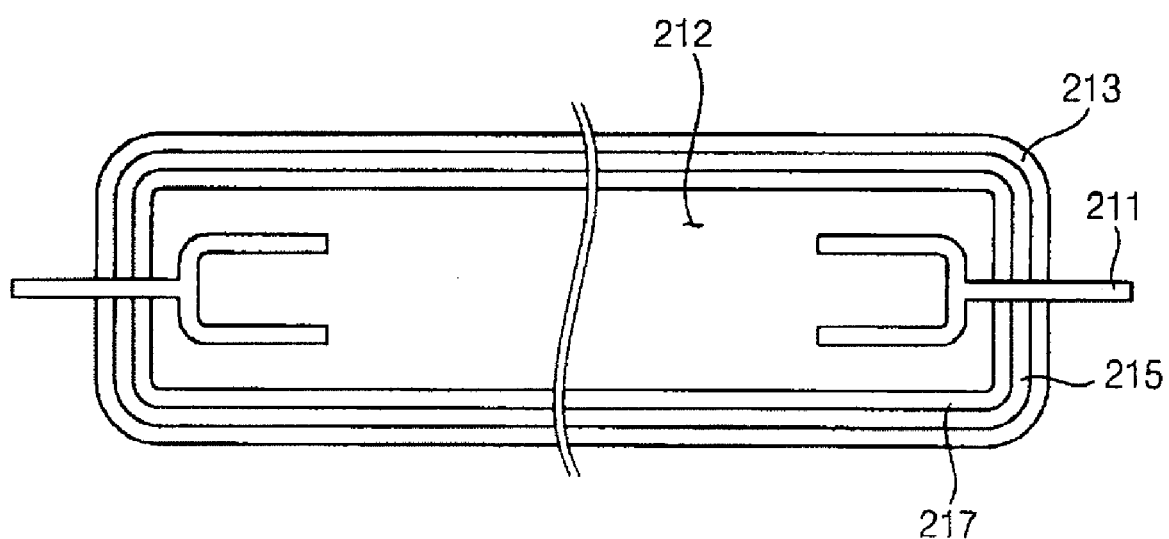
FIG. 2 is a cross-sectional view illustrating a cold cathode fluorescent lamp (CCFL) shown in FIG. 1.

FIG. 2 is a cross-sectional view illustrating a cold cathode fluorescent lamp (CCFL) shown in FIG. 1.

Referring to FIG. 2, the CCFL 210 includes a discharge electrode 211, a lamp body 213, a fluorescent layer 215 and a protecting layer 217.

For example, the lamp body 213 includes a glass tube extended in an axial direction to form a discharge space 212 in the lamp body 213. A discharge gas is filled in the discharge space 212. For example, the discharge gas includes a mercury gas, an argon gas, etc.

The discharge electrode 211 is on an end portion of the discharge space 212, and is protruded toward an exterior to the lamp body 213.

When a discharge voltage is applied to the discharge electrode 211, the discharge gas in the discharge space 212 is discharged to generate excitons from the discharge gas.

Ultraviolet light is generated in the discharge space by the excitons. The ultraviolet light is irradiated onto the fluorescent layer 215, and visible light is generated from the fluorescent layer 215.

For example, the fluorescent layer 215 includes a red fluorescent material, a green fluorescent mixture and a blue fluorescent material.

Examples of the red fluorescent material include but are not limited to YOX, YPV, MFG, YGB, YV, CMB, YOS, etc. These materials may be used alone or in a combination thereof.

The green fluorescent mixture includes a main green fluorescent material of about 65 to about 85 wt %, a first auxiliary green fluorescent material of about 10 to about 20 wt %, and a second auxiliary green fluorescent material of about 5 to about 15 wt %. The first auxiliary green fluorescent material generates light having lower color reproducibility and higher luminance than the main green fluorescent material. The second auxiliary green fluorescent material generates light having higher color reproducibility and lower luminance than the main green fluorescent material. For example, the main green fluorescent material includes BAM:Mn, and the first auxiliary green fluorescent material includes, for example, CMZ. Also, the second auxiliary green fluorescent material may include, for example, LAP. For example, the main green fluorescent material may be about 75 wt %, and the first auxiliary green fluorescent material may be about 10 wt %. The second auxiliary green fluorescent material may be about 15 wt %.

In FIG. 1, the main green fluorescent material, the first auxiliary green fluorescent material and the second auxiliary green fluorescent material include BAM:Mn, LAP and CMZ, respectively. Alternatively, the main green fluorescent material, the first auxiliary green fluorescent material and the second auxiliary green fluorescent material may include, for example, various green fluorescent materials. For example, the main green fluorescent material may include $(Ba,Sr)MgAl_{10}O_{17}:Eu^{2+},Mn^{2+}$, and the first auxiliary green fluorescent material may include CAT, YBT, etc. Also, the second auxiliary green fluorescent material may include, for example, $BaMgAl_{14}O_{23}:Mn^{2+}$.

Examples of the red fluorescent material may include $Y_2O_3:Eu^{3+}$ (YOX), $Y(P,V)O_4:Eu^{3+}$ (YPV), $3.5MgO\cdot0.5MgF_2\cdot GeO_2:Mn^{4+}$ (MFG), $(Y,Gd)BO_3:Eu^{3+}$ (YGB), $YVO_4:Eu^{3+}$ (YV), $(Ce,Gd)MgB_5O_{10}:Mn^{2+}$ (CMB), $Y_2O_2S:Eu^{3+}$ (YOS), etc. These materials may be used alone or in a combination thereof.

Table 2 represents optical characteristics of the red fluorescent material.

TABLE 2

| red fluorescent material | Peak wavelength | color | luminance | color reproducibility | lifetime |
|---|---|---|---|---|---|
| YOX | 613 | red | ○ | □ | ○ |
| YPV | 620 | red | □ | ○ | X |
| MFG | 623-664 | red | X | ○ | X |
| YGB | 611 | red | ○ | □ | ○ |
| YV | 620 | red | □ | ○ | X |
| CMB | 620 | red | X | ○ | □ |
| YOS | 626 | red | X | ○ | X |

Referring to FIG. 2, when ultraviolet light is irradiated onto YOX, a wavelength of a peak of the red light generated from YOX is about 613 nm, luminance and lifetime are good, and color reproducibility is normal. When ultraviolet light is irradiated onto YPV, a wavelength of a peak of the red light generated from YPV is about 620 nm, color reproducibility is good, luminance is normal, and lifetime is poor. When ultraviolet light is irradiated onto MFG, a wavelength of a peak of the red light generated from MFG is about 623 to 664 nm, color reproducibility is good, luminance and lifetime are poor. When ultraviolet light is irradiated onto YGB, a wavelength of a peak of the red light generated from YGB is about 611 nm, luminance and lifetime are good, and color reproducibility is normal. When ultraviolet light is irradiated onto YV, a wavelength of a peak of the red light generated from YV is about 620 nm, color reproducibility is good, luminance is normal, and lifetime is poor. When ultraviolet light is irradiated onto CMB, a wavelength of a peak of the red light generated from CMB is about 620 nm, color reproducibility is good, lifetime is normal, and luminance is poor. When ultraviolet light is irradiated onto YOS, a wavelength of a peak of the red light generated from YOS is about 626 nm, color reproducibility is good, and luminance and lifetime are poor.

The color reproducibility of the cold cathode fluorescent lamp including each of the red fluorescent materials alternates against the luminance of the cold cathode fluorescent lamp including the red fluorescent material. For example, the red fluorescent material of the good color reproducibility has bad or normal luminance. The red fluorescent material of the good luminance has poor or normal color reproducibility.

Examples of the blue fluorescent material may include $Sr_5(PO_4)_3Cl:Eu^{2+}$ (SPE), $BaMgAl_{10}O_{17}:Eu^{2+}$ (BAM), $Sr_2Al_6O_{11}:Eu^{2+}$ (SAE), $BaAl_8O_{13}:Eu^{2+}$ (BAE), $CaMgSi_2O_6:Eu^{2+}$ (CMS), $(Sr,Ca,Ba,Mg)_5(PO_4)_3Cl:Eu^{2+}$ (SCA), $Sr_4Al_{14}O_{25}:Eu^{2+}$ (SA), etc. These materials may be used alone or in a combination thereof.

Table 3 represents optical characteristics of the blue fluorescent material.

TABLE 3

| blue fluorescent material | peal wavelength | color | luminance | color reproducibility | lifetime |
|---|---|---|---|---|---|
| SPE | 445 | blue | □ | ○ | □ |
| BAM | 450 | blue | ○ | □ | □ |
| SAE | 460 | blue | □ | X | ○ |
| BAE | 480 | blue | □ | X | ○ |
| CMS | 450 | blue | □ | ○ | ○ |
| SCA | 448 | blue | ○ | ○ | □ |
| SA | 490 | blue | ○ | X | ○ |

Referring to Table 3, when ultraviolet light is irradiated onto SPE, a wavelength of a peak of the blue light generated from SPE is about 445 nm, color reproducibility is good, and luminance and lifetime are normal. When ultraviolet light is irradiated onto BAM, a wavelength of a peak of the blue light generated from BAM is about 450 nm, luminance is good, and color reproducibility and lifetime are normal. When ultraviolet light is irradiated onto SAE, a wavelength of a peak of the blue light generated from SAE is about 460 nm, lifetime is good, luminance is normal, and color reproducibility is poor. When ultraviolet light is irradiated onto BAE, a wavelength of a peak of the blue light generated from BAE is about 480 nm, lifetime is good, luminance is normal, and color reproducibility is poor. When ultraviolet light is irradiated onto CMS, a wavelength of a peak of the blue light generated from CMS is about 450 nm, color reproducibility and lifetime are good, and luminance is normal. When ultraviolet light is irradiated onto SCA, a wavelength of a peak of the blue light generated from SCA is about 448 nm, luminance and color reproducibility are good, and lifetime is normal. When ultraviolet light is irradiated onto SA, a wavelength of a peak of the blue light generated from SA is about 490 nm, luminance and lifetime are good, and color reproducibility is poor.

The color reproducibility of the cold cathode fluorescent lamp including each of the blue fluorescent materials alternates against the luminance of the cold cathode fluorescent lamp including the blue fluorescent material. For example, the blue fluorescent material of the good color reproducibility has poor or normal luminance. The blue fluorescent material of the good luminance has poor or normal color reproducibility.

The luminance of the light generated from the cold cathode fluorescent lamp 210 is determined by mixing the red light generated from the red fluorescent material, the green light generated from the green fluorescent material, and the blue light generated from the blue fluorescent material.

For example, the luminance of the red light and the blue light is poorer than the luminance of the green light, so that the luminance of the green light may be about 50 to about 60% of the luminance of the light generated from the cold cathode fluorescent lamp 210. That is, the luminance of the green light is greater than summation of the luminance of the red and blue lights.

Therefore, when the luminance of the green light is increased, the luminance of the cold cathode fluorescent lamp 210 is increased.

When the cold cathode fluorescent lamp includes a single green fluorescent material, the color reproducibility of the green light may be decreased by increasing of the luminance of the green light.

However, in the present exemplary embodiment, the green fluorescent mixture includes the BAM:Mn that has high luminance and is used as the main green fluorescent material, the CMZ that has high color reproducibility and is used as the first auxiliary green fluorescent material, and the LAP that has high luminance and is used as the second auxiliary green fluorescent material. Thus, the color reproducibility and the luminance of the green light generated from the cold cathode fluorescent lamp 210 are optimized.

For example, the red fluorescent material, the green fluorescent mixture and the blue fluorescent material are mixed, and the mixed fluorescent materials are coated on an inner surface of the lamp body 213 to form the fluorescent layer 215.

The protecting layer 217 is formed on the fluorescent layer 215 to protect the fluorescent layer 215. For example, the protecting layer 217 prevents mercury molecules of the discharge gas from being attached onto the fluorescent layer 215, thereby increasing the lifetime of the cold cathode fluorescent lamp 210.

Referring again to FIG. 1, the lamp cover 220 includes a highly reflective material and covers the cold cathode fluorescent lamp 210 to reflect the light generated from the cold cathode fluorescent lamp 210 toward the light guiding plate 300.

The lamp wire 230 is electrically connected to the discharge electrode 211 of the cold cathode fluorescent lamp 210 to transmit the discharge voltage.

For example, the light source module 200 includes a side illumination type light source module disposed on a side of the light guiding plate 300. Alternatively, the light source module may include a direct illumination type light source module including a plurality of cold cathode fluorescent lamps aligned substantially in parallel with each other.

The light guiding plate 300 is disposed in the receiving space of the receiving container 100 and the light source module 200 is on the side of the light guiding plate 300. The light guiding plate 300 changes a linear light generated from the light source module 200 into a planar light to guide the planar light toward the LCD panel 600.

The reflecting plate 400 is disposed under the light guiding plate 300 to reflect the light leaked from a lower surface of the light guiding plate 300 toward an upper surface of the light guiding plate 300.

The mold frame 500 is on a peripheral portion of the light guiding plate 300, and includes a sidewall 520 and a stepped portion 510.

The LCD panel 600 is disposed on the stepped portion 510 of the mold frame 500, and displays an image using the light emitting from the light guiding plate 300. Alternatively, an electrophoretic display (EPD) panel may be used to display the image.

According to the display device of FIGS. 1 and 2, the fluorescent layer 215 includes the green fluorescent mixture, so that the luminance and the color reproducibility of the cold cathode fluorescent lamp 210 are optimized to improve the image display quality of the display device.

Figure 3:
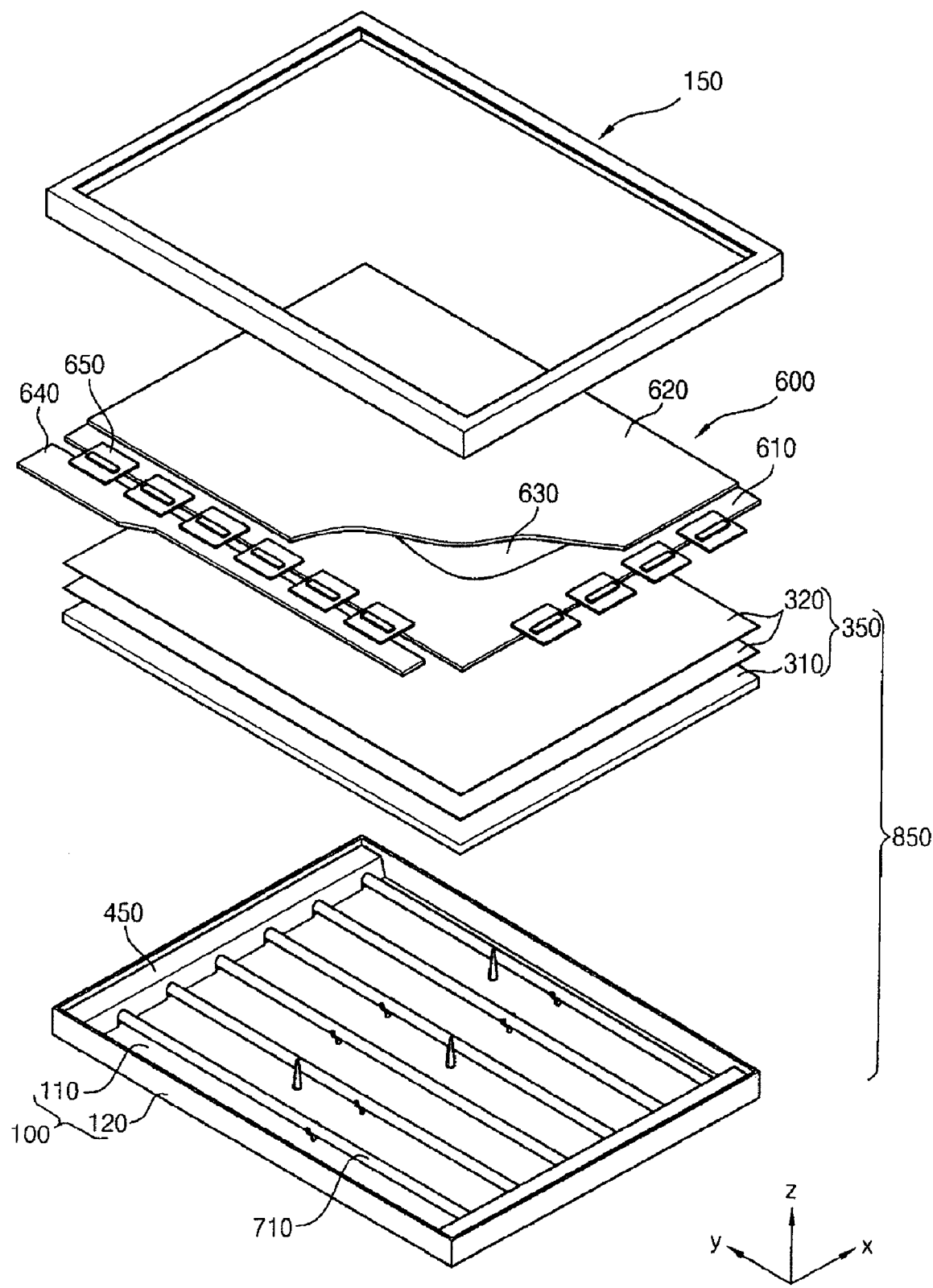
FIG. 3 is an exploded perspective view illustrating a display device in accordance with an exemplary embodiment of the present invention.

FIG. 3 is an exploded perspective view illustrating a display device in accordance with another exemplary embodiment of the present invention.

Referring to FIG. 3, the display device includes a backlight assembly 850 and an LCD panel 600.

The backlight assembly 850 includes a receiving container 100, a side mold 450 and a plurality of external electrode fluorescent lamps 710.

The receiving container 100 includes a bottom plate 110 and a sidewall 120 protruded from a side of the bottom plate 110 to form a receiving space.

The external electrode fluorescent lamps 710 are aligned substantially in parallel with each other in the receiving space of the receiving container 100.

Figure 4:
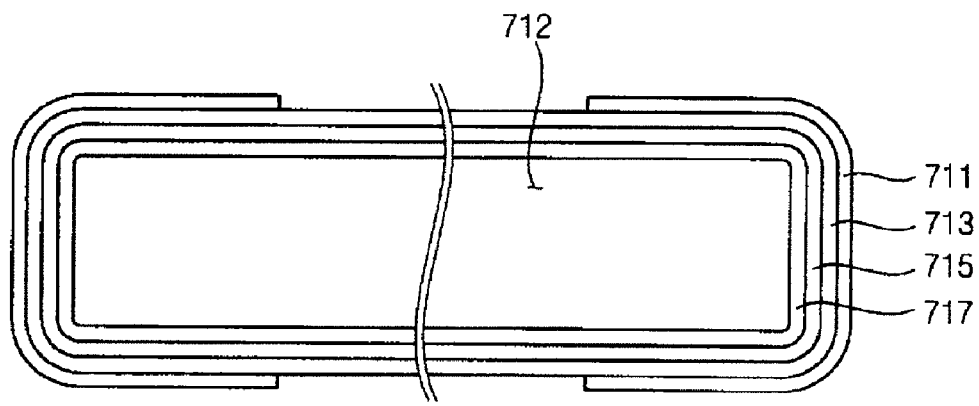
FIG. 4 is a cross-sectional view illustrating an external electrode fluorescent lamp shown in FIG. 3.

FIG. 4 is a cross-sectional view illustrating an external electrode fluorescent lamp shown in FIG. 3. The external electrode fluorescent lamp of FIG. 4 is same as in FIG. 2 except the discharge electrode 711. Thus, the same reference numerals will be used to refer to the same or like parts as those described in FIG. 2 and any further explanation concerning the above elements will be omitted.

Referring to FIG. 4, the external electrode fluorescent lamp 710 includes a discharge electrode 711, a lamp body 713, a fluorescent layer 715 and a protecting layer 717.

The discharge electrode 711 is on an end portion of the lamp body 713 and covers an outer surface of the lamp body 713.

For example, a plurality of the external electrode fluorescent lamps 710 is aligned substantially in parallel with each other to form a direct illumination typed light source module.

Referring again to FIG. 3, the side mold 450 is adjacent to the side of the receiving space of the receiving container 100 to fix the end portions of the external electrode fluorescent lamps 710 to the receiving container 100.

The optical member 350 is on the side mold 450 to improve the optical characteristics of the light generated from the external electrode fluorescent lamp 710. For example, the optical member 350 may include a diffusion plate 310 and an optical sheet 320.

The diffusion plate 310 is supported by the side mold 450, and diffuses the light generated from the external electrode fluorescent lamp 710 to increase luminance uniformity.

The optical sheet 320 is on the diffusion plate 310 and may include, for example, a prism sheet, a diffusion sheet, etc. The prism sheet increases a frontal luminance of the light having passed through the diffusion plate 310.

The LCD panel 600 is on the backlight assembly 850, and includes an array substrate 610, an opposite substrate 620, a liquid crystal layer 630, an integrated printed circuit board 640 and a flexible circuit board 650.

The liquid crystal layer 630 is interposed between the array substrate 610 and the opposite substrate 620. Light transmittance of the liquid crystal layer 630 is changed in response to an image signal applied to the array substrate 610 through the integrated printed circuit board 640 and the flexible circuit board 650. The light generated from the backlight assembly 850 passes through the liquid crystal layer 630 having the changed light transmittance to display the image.

For example, the display device may further include a top chassis 150 that fixes the LCD panel 600 to the backlight assembly 850.

According to the present exemplary embodiment, the discharge electrode 711 is formed on the outer surface of the lamp body 713, so that the backlight assembly 850 having the external electrode fluorescent lamp 710 may be readily fabricated.

Figure 5:
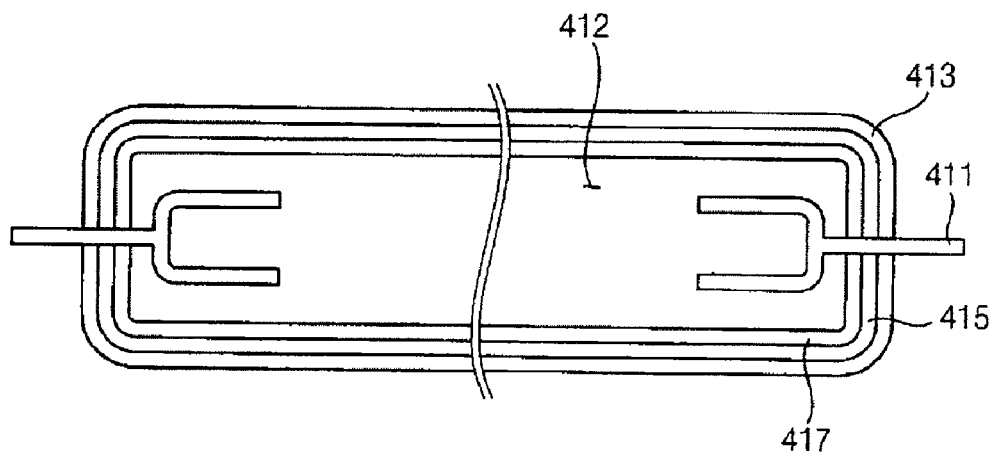
FIG. 5 is a cross-sectional view illustrating an external electrode fluorescent lamp in accordance with an exemplary embodiment of the present invention.

FIG. 5 is a cross-sectional view illustrating an external electrode fluorescent lamp in accordance with another exemplary embodiment of the present invention. The cold cathode fluorescent lamp of FIG. 5 is same as in FIG. 1 except a fluorescent mixture. Thus, the same reference numerals will be used to refer to the same or like parts as those described in FIG. 1 and any further explanation concerning the above elements will be omitted.

Referring to FIG. 5, the cold cathode fluorescent lamp 410 includes a discharge electrode 411, a lamp body 413, a fluorescent layer 415 and a protecting layer 417.

The fluorescent layer 215 includes a fluorescent mixture. The fluorescent mixture includes a red fluorescent material of about 45 to about 50 wt %, a green fluorescent material of about 29 to about 33 wt %, and a green fluorescent material of about 20 to about 26 wt %. For example, the red fluorescent material may include $(Sr,Ca,Ba,Mg)_5(PO_4)_3Cl:Eu^{2+}$ (SCA), and the blue fluorescent material may include $Y_2O_3:Eu^{3+}$ (YOX). The green fluorescent material may include, for example, $(Ce,Mg,Zn)Al_{11}O_{19}:Mn^{2+}$ (CMZ).

For example, the fluorescent mixture may be coated on an inner surface of the lamp body 213 to form the fluorescent layer 215.

Green Fluorescent Mixture for Display Device

Example 1

To manufacture a fluorescent lamp, a green fluorescent mixture was coated on an inner surface of a lamp body to form a fluorescent layer. The fluorescent lamp of Example 1 is same as in FIG. 2. Thus, the same reference numerals will be used to refer to the same or like parts as those described in FIG. 2 and any further explanation concerning the above elements will be omitted.

To prepare the green fluorescent mixture, BAM:Mn of about 75 wt % as a main green fluorescent material, LAP of about 15 wt % as a first auxiliary green fluorescent material, and CMZ of about 10 wt % as a second auxiliary green fluorescent material were mixed.

In the present example, the green fluorescent materials of power were mixed and binded using a binding agent, and the mixture was coated on an inner surface of the lamp body 215.

Example 2

A fluorescent material of Example 2 is same as in Example 1 except proportion of a main green fluorescent material, a first auxiliary green fluorescent material and a second auxiliary green fluorescent material. Thus, any further explanation concerning the above elements will be omitted.

To prepare the green fluorescent mixture, BAM:Mn of about 65 wt % as a main green fluorescent material, LAP of about 15 wt % as a first auxiliary green fluorescent material, and CMZ of about 20 wt % as a second auxiliary green fluorescent material were mixed.

Example 3

A fluorescent material of Example 3 is same as in Example 1 except proportion of a main green fluorescent material, a first auxiliary green fluorescent material and a second auxiliary green fluorescent material. Thus, any further explanation concerning the above elements will be omitted.

To prepare the green fluorescent mixture, BAM:Mn of about 80 wt % as a main green fluorescent material, LAP of about 10 wt % as a first auxiliary green fluorescent material, and CMZ of about 10 wt % as a second auxiliary green fluorescent material were mixed.

Comparative Example 1

To manufacture a fluorescent lamp, a green fluorescent mixture was coated on an inner surface of a lamp body to form a fluorescent layer. The fluorescent lamp of Comparative Example 1 is same as in FIG. 2. Thus, the same reference numerals will be used to refer to the same or like parts as those described in FIG. 2 and any further explanation concerning the above elements will be omitted.

To prepare the green fluorescent mixture, BAM:Mn of about 55 wt % as a main green fluorescent material, LAP of about 15 wt % as a first auxiliary green fluorescent material, and CMZ of about 30 wt % as a second auxiliary green fluorescent material were mixed.

Comparative Example 2

A fluorescent material of Comparative Example 2 is same as in Comparative Example 1 except proportion of a main green fluorescent material, a first auxiliary green fluorescent material and a second auxiliary green fluorescent material. Thus, any further explanation concerning the above elements will be omitted.

To prepare the green fluorescent mixture, BAM:Mn of about 45 wt % as a main green fluorescent material, LAP of about 15 wt % as a first auxiliary green fluorescent material, and CMZ of about 40 wt % as a second auxiliary green fluorescent material were mixed.

Comparative Example 3

To manufacture a fluorescent lamp, a green fluorescent mixture was coated on an inner surface of a lamp body to form a fluorescent layer. The fluorescent lamp of Comparative Example 3 is same as in FIG. 2. Thus, the same reference numerals will be used to refer to the same or like parts as those described in FIG. 2 and any further explanation concerning the above elements will be omitted.

To prepare the green fluorescent mixture, BAM:Mn of about 90 wt %, and LAP of about 10 wt % were mixed.

Comparative Example 4

A fluorescent material of Comparative Example 4 is same as in Comparative Example 3 except proportion of BAM:Mn and LAP. Thus, any further explanation concerning the above elements will be omitted.

To prepare the green fluorescent mixture, BAM:Mn of about 85 wt %, and LAP of about 15 wt % were mixed.

Comparative Example 5

A fluorescent material of Comparative Example 5 is same as in Comparative Example 3 except proportion of BAM:Mn and LAP. Thus, any further explanation concerning the above elements will be omitted.

To prepare the green fluorescent mixture, BAM:Mn of about 80 wt %, and LAP of about 20 wt % were mixed.

Comparative Example 6

A fluorescent material of Comparative Example 6 is same as in Comparative Example 3 except proportion of BAM:Mn and LAP. Thus, any further explanation concerning the above elements will be omitted.

To prepare the green fluorescent mixture, BAM:Mn of about 70 wt %, and LAP of about 30 wt % were mixed.

Comparative Example 7

A fluorescent material of Comparative Example 7 is same as in Comparative Example 3 except proportion of BAM:Mn and LAP. Thus, any further explanation concerning the above elements will be omitted.

To prepare the green fluorescent mixture, BAM:Mn of about 50 wt %, and LAP of about 50 wt % were mixed.

Experiment 1

Figure 6:
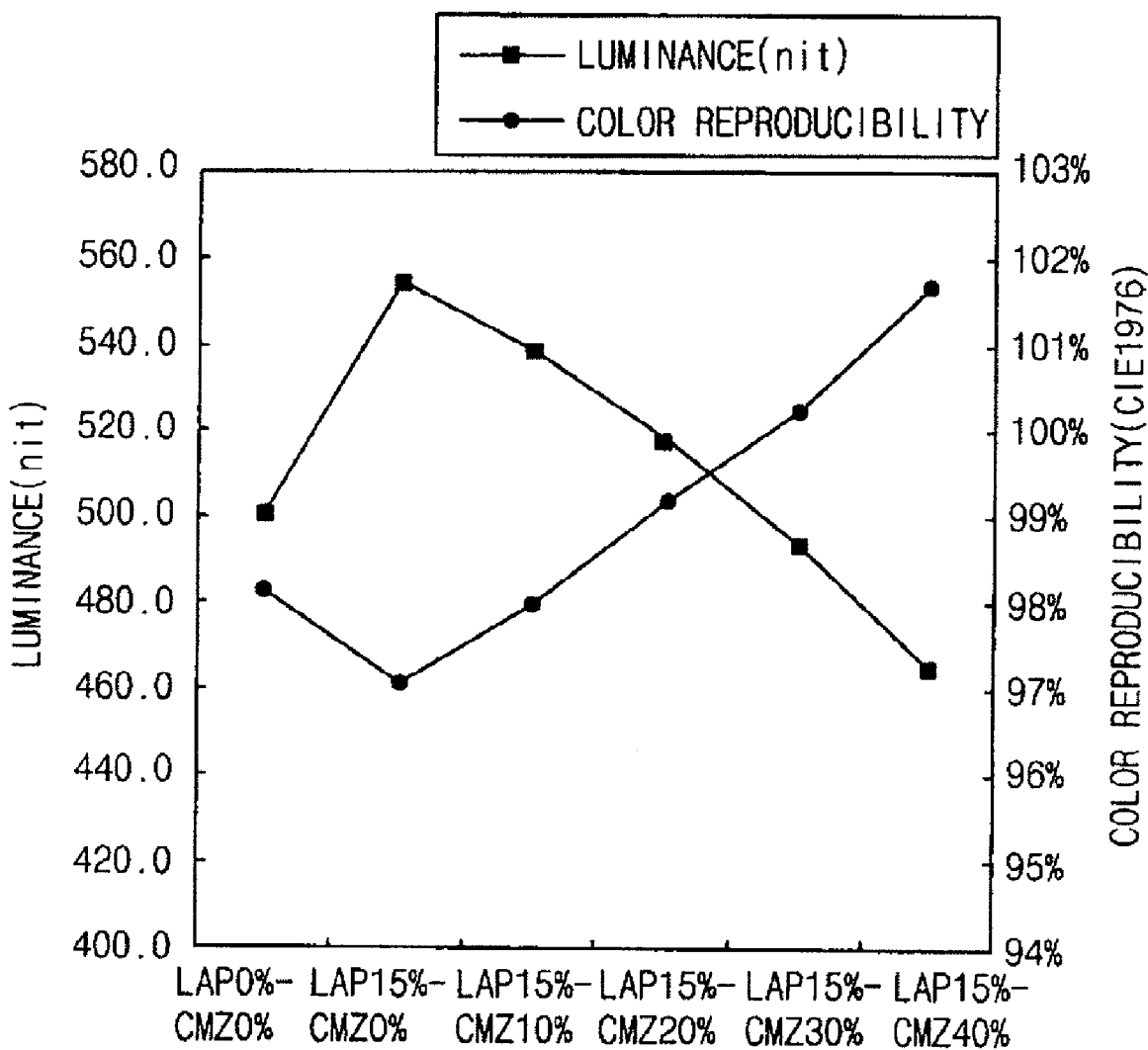
FIG. 6 is a graph illustrating a relationship between luminance and color reproducibility of a cold cathode fluorescent lamp including various green fluorescent mixtures in accordance with one example of the present invention.

FIG. 6 is a graph illustrating a relationship between luminance and color reproducibility of a cold cathode fluorescent lamp including various green fluorescent mixtures in accordance with one example of the present invention. The green fluorescent mixture of FIG. 6 is same as in Examples 1 and 2. Thus, any further explanation concerning the above elements will be omitted.

Referring to FIG. 6, the green fluorescent mixture included BAM:Mn as a main green fluorescent material, LAP as a first auxiliary green fluorescent material, and CMZ as a second auxiliary green fluorescent material.

In the present experiment, a proportion of the LAP was fixed to about 15 wt %, and a proportion of the CMZ was changed. A cold cathode fluorescent lamp including a red fluorescent material for generating red light, the green fluorescent mixture for generating green light and a blue fluorescent material for generating blue light has color reproducibility of about 98.1%.

In FIG. 6, when the LAP was about 15%, luminance is increased and color reproducibility was decreased compared with a green fluorescent material including pure BAM:Mn.

When the green fluorescent mixture included the BAM:Mn of about 75 wt %, the LAP of about 15 wt % and the CMZ of about 10 wt %, the color reproducibility was 98.1% and the luminance was about 540 nit.

When the green fluorescent mixture included the BAM:Mn of about 65 wt %, the LAP of about 15 wt % and the CMZ of about 20 wt %, the color reproducibility was 99.2% and the luminance was about 520 nit.

When the green fluorescent mixture included the BAM:Mn of about 55 wt %, the LAP of about 15 wt % and the CMZ of about 30 wt %, the color reproducibility was 100.2% and the luminance was about 490 nit.

When the green fluorescent mixture included the BAM:Mn of about 45 wt %, the LAP of about 15 wt % and the CMZ of about 40 wt %, the color reproducibility was 101.8% and the luminance was about 460 nit.

In the present experiment, the color reproducibility of the red and blue lights generated from the red and blue fluorescent materials was about 98.1%. Thus, when the color reproducibility of the green light generated from the green fluorescent mixture was more than about 98.1%, the color reproducibility of the green light was sufficient.

Therefore, the optimized proportion of the green fluorescent materials for maintaining the color reproducibility of more than about 98.1% was the BAM:Mn of about 75 wt %, the LAP of about 15 wt % and the CMZ of about 10 wt %.

When the color reproducibility of the red and blue lights is changed, the proportion of the CMZ may also be changed based on the changed color reproducibility of the red and blue lights. For example, the proportion of the CMZ may be about 5 to about 15 wt %. Alternatively, when the color reproducibility of the red and blue lights is more than about 100%, the CMZ may be more than about 30 wt %.

Figure 7A:
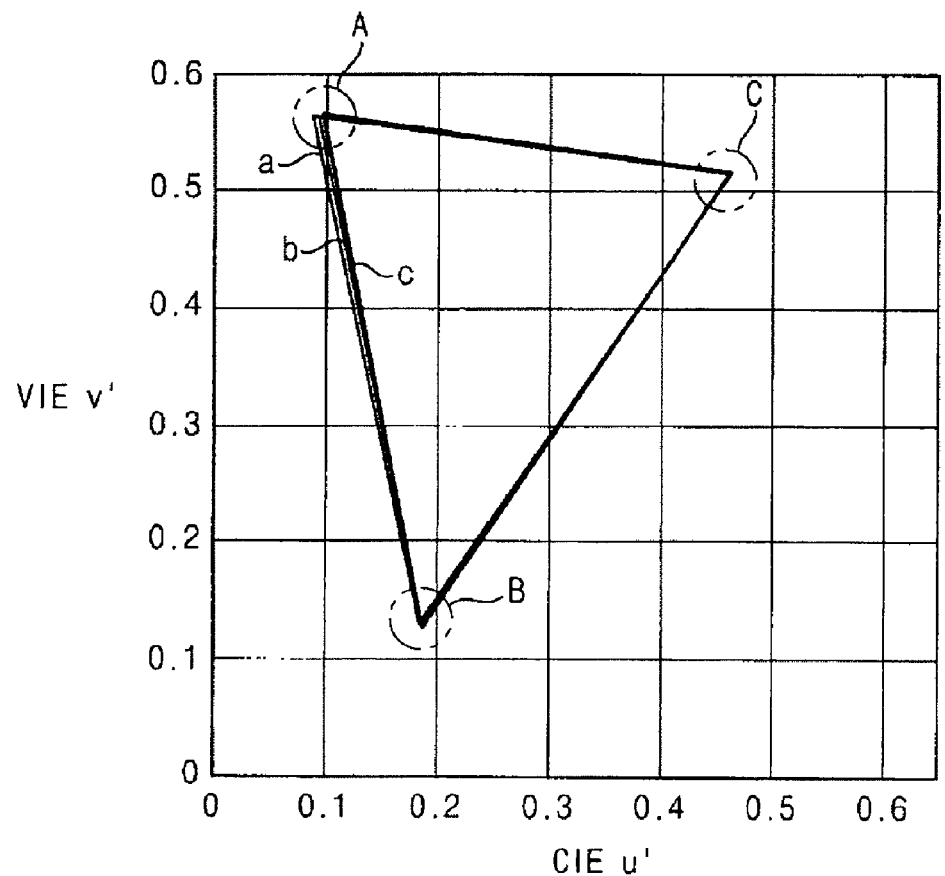
FIGS. 7A to 7D are graphs illustrating color reproducibility of red, green and blue lights generated from a cold cathode fluorescent lamp including various green fluorescent mixtures in accordance with one example of the present invention.

FIG. 7A is a graph illustrating color reproducibility of red, green and blue lights of a cold cathode fluorescent lamp including various green fluorescent mixtures in accordance with examples of the present invention. In FIG. 7A, green fluorescent material included SCA, and red fluorescent material included YOX.

Referring to graph 'a' of FIG. 7A, when the green fluorescent material includes the pure BAM:Mn, color coordinates (u', v') of the red, green and blue lights were (0.469, 0.524), (0.078, 0.567) and (0.163, 0.181), respectively. The luminance of the graph 'a' was set to be 100% of relative luminance for graphs 'b' and 'c'. The color reproducibility of the graph 'a' was about 98.1% with respect to CIE1976 color coordinate system.

Referring to graph 'b' of FIG. 7A, when the green fluorescent material includes the BAM:Mn of about 85 wt % and the LAP of about 15 wt %, color coordinates (u', v') of the red, green and blue lights were (0.455, 0.522), (0.091, 0.565) and (0.168, 0.179), respectively. The relative luminance of the graph 'b' was about 112%. The color reproducibility of the graph 'b' was about 90.9% with respect to the CIE1976 color coordinate system.

Referring to graph 'c' of FIG. 7A, when the green fluorescent material includes the BAM:Mn of about 75 wt %, the LAP of about 15 wt % and CMZ of about 10 wt %, color coordinates (u', v') of the red, green and blue lights were (0.464, 0.523), (0.090, 0.567) and (0.169, 0.170), respectively. The relative luminance of the graph 'c' was about 108%. The color reproducibility of the graph 'c' was about 97.4% with respect to the CIE1976 color coordinate system.

Figure 7B:
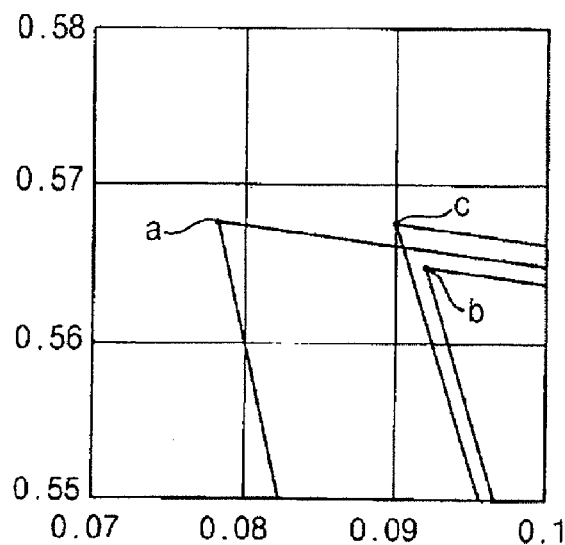

FIG. 7B is a graph illustrating a portion 'A' of FIG. 7A, which corresponds to a green region of the CEI1976 color coordinates.

Referring to FIG. 7B, when the green fluorescent material includes the pure BAM:Mn, which corresponds to the graph 'a', the color reproducibility of the green light is better than the graphs 'b' and 'c'. When the green fluorescent material includes the BAM:Mn of about 85 wt % and the LAP of about 15 wt %, which corresponds to the graph 'b', the color reproducibility of the green light is worse than the graphs 'a' or 'c'. When the green fluorescent material includes the BAM:Mn of about 75 wt %, the LAP of about 15 wt % and the CMZ of about 10 wt %, which corresponds to the graph 'c', the color reproducibility of the green light is better than the graph 'c' and is worse than the graphs 'a'. Although the color reproducibility of the graph 'a' is better than the graphs 'b' and 'c', the luminance of the pure BAM:Mn, which corresponds to the graph 'a', is worse than the graphs 'b' and 'c.

Figure 7C:
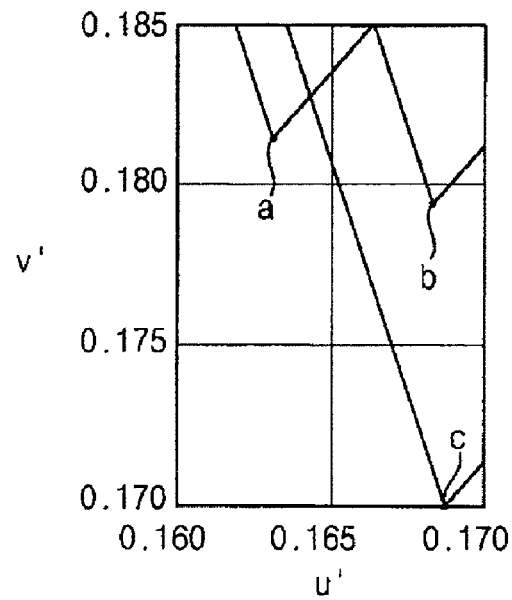

FIG. 7C is a graph illustrating a portion 'B' of FIG. 7A, which corresponds to a blue region of the CEI 1976 color coordinates.

Referring to FIG. 7C, when the green fluorescent material includes the BAM:Mn of about 75 wt %, the LAP of about 15 wt % and CMZ of about 10 wt %, which corresponds to the graph 'c', the color reproducibility of the blue light is better than the graphs 'b' and 'c'. When the green fluorescent material includes the pure BAM:Mn, which corresponds to the graph 'a', the color reproducibility of the blue light is worse than the graphs 'b' or 'c'. When the green fluorescent material includes the BAM:Mn of about 85 wt % and the LAP of about 15 wt %, which corresponds to the graph 'b', the color reproducibility of the blue light is better than the graph 'a' and is worse than the graphs 'c'.

Figure 7D:
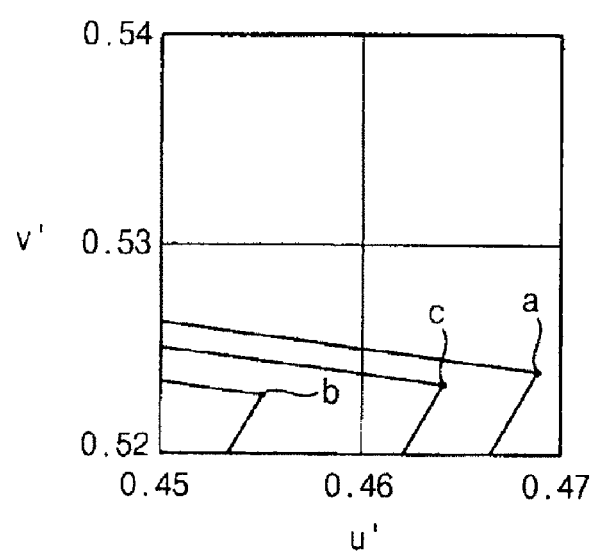

FIG. 7D is a graph illustrating a portion 'C' of FIG. 7A, which corresponds to a red region of the CEI 1976 color coordinates.

Referring to FIG. 7D, when the green fluorescent material includes the pure BAM:Mn, which corresponds to the graph 'a', the color reproducibility of the red light is better than the graphs 'b' and 'c'. When the green fluorescent material includes the BAM:Mn of about 85 wt % and the LAP of about 15 wt %, which corresponds to the graph 'b', the color reproducibility of the red light is worse than the graphs 'a' or 'c'. When the green fluorescent material includes the BAM:Mn of about 75 wt %, the LAP of about 15 wt % and CMZ of about 10 wt %, which corresponds to the graph 'c', the color reproducibility of the red light is better than the graph 'b' and is worse than the graphs 'a'.

Referring to FIGS. 7A to 7D, when the green fluorescent material includes the BAM:Mn of about 75 wt %, the LAP of about 15 wt % and CMZ of about 10 wt %, which corresponds to the graph 'c', the color reproducibility of the light generated from the green fluorescent material including the BAM:Mn, the LAP and the CMZ is substantially the same as that of the light generated from the green fluorescent material including the pure BAM:Mn, and the luminance is increased by about 8% compared with the light generated from the green fluorescent material including the pure BAM:Mn. In addition, when the green fluorescent material includes the BAM:Mn of about 75 wt %, the LAP of about 15 wt % and CMZ of about 10 wt %, which corresponds to the graph 'c', the luminance of the light generated from the green fluorescent material including the BAM:Mn, the LAP and the CMZ is substantially the same as that of the light generated from the green fluorescent material including the BAM:Mn and the LAP, and the color reproducibility is increased by about 6.3% compared with the light generated from the green fluorescent material including the BAM:Mn and the LAP.

Experiment 2

Figure 8:
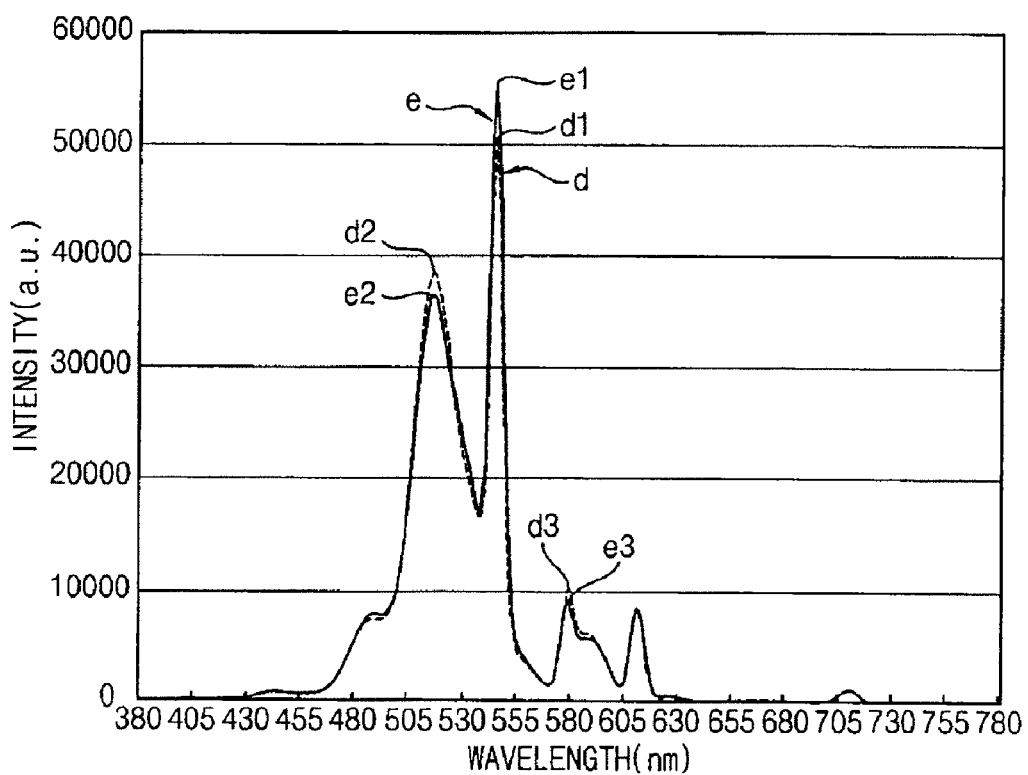
FIG. 8 is a graph illustrating a relationship between intensity and wavelength of light generated from a cold cathode fluorescent lamp including various green fluorescent mixtures in accordance with one example of the present invention.

FIG. 8 is a graph illustrating a relationship between intensity and wavelength of light generated from a cold cathode fluorescent lamp including various green fluorescent mixtures in accordance with one example of the present invention. The green fluorescent mixture of FIG. 8 is same as in Examples 1 and 3. Thus, any further explanation concerning the above elements will be omitted.

Referring to FIG. 8, the green fluorescent mixture included BAM:Mn as a main green fluorescent material, LAP as a first auxiliary green fluorescent material, and CMZ as a second auxiliary green fluorescent material. In the present experiment, a proportion of the CMZ was fixed to about 10 wt %, and a proportion of the LAP was changed.

When the green fluorescent mixture includes the BAM:Mn of about 80 wt %, the LAP of about 10 wt % and CMZ of about 10 wt %, which corresponds to the graph 'd', wavelengths of first, second and third peaks d1, d2 and d3 are about 545 nm, about 516 nm and about 579 nm, respectively, and intensities of the first, second and third peaks d1, d2 and d3 are about 50705 a.u., about 38455 a.u., and about 9064 a.u. The ratio between the intensities of the first, second and third peaks d1, d2 and d3 is about 1:0.76:0.18. When the intensity of the second peak d2 is set to be 1, the ratio between the intensities of the first, second and third peaks d1, d2 and d3 is about 1.32:1:0.25.

When the green fluorescent mixture includes the BAM:Mn of about 75 wt %, the LAP of about 10 wt % and CMZ of about 15 wt %, which corresponds to the graph 'e', wavelengths of first, second and third peaks e1, e2 and e3 are about 545 nm, about 516 nm and about 579 nm, respectively, and intensities of the first, second and third peaks e1, e2 and e3 are about 55641 a.u., about 36400 a.u., and about 9339 a.u. The ratio between the intensities of the first, second and third peaks e1, e2 and e3 is about 1:0.65:0.17. When the intensity of the second peak e2 is set to be 1, the ratio between the intensities of the first, second and third peaks e1, e2 and e3 is about 1.53:1:0.26.

The intensity of the first peak d1 and e1 is increased, as the proportion of the LAP is increased. The intensity of the second peak d2 and e2 is increased, as the proportion of the BAM:Mn is increased. Thus, the intensity of the third peak d3 and e3 corresponds to the proportion of the CMZ.

In the present experiment, the intensity of the first peak d1 and e1, the intensity of the second peak d2 and e2 and the intensity of the third peak d3 and e3 may be increased by the proportions of the LAP, the BAM:Mn and the CMZ, respectively. When the proportion of the CMZ is about 10 wt % and the proportion of the LAP is about 10 to 20 wt %, the ratio between the intensities of the first and second peaks d1, e1, d2 and e2 may be about 1.32:1 to about 1.71:1. Also, the proportion of the BAM:Mn is about 70 to about 80 wt %, the ratio between the intensities of the second and third peaks d2, e2, d3 and e3 may be about 1:0.25 to 1:0.27.

In the present experiment, the CMZ prevents the disturbance of the blue light by the LAP.

Comparative Experiment 1

Figure 9:
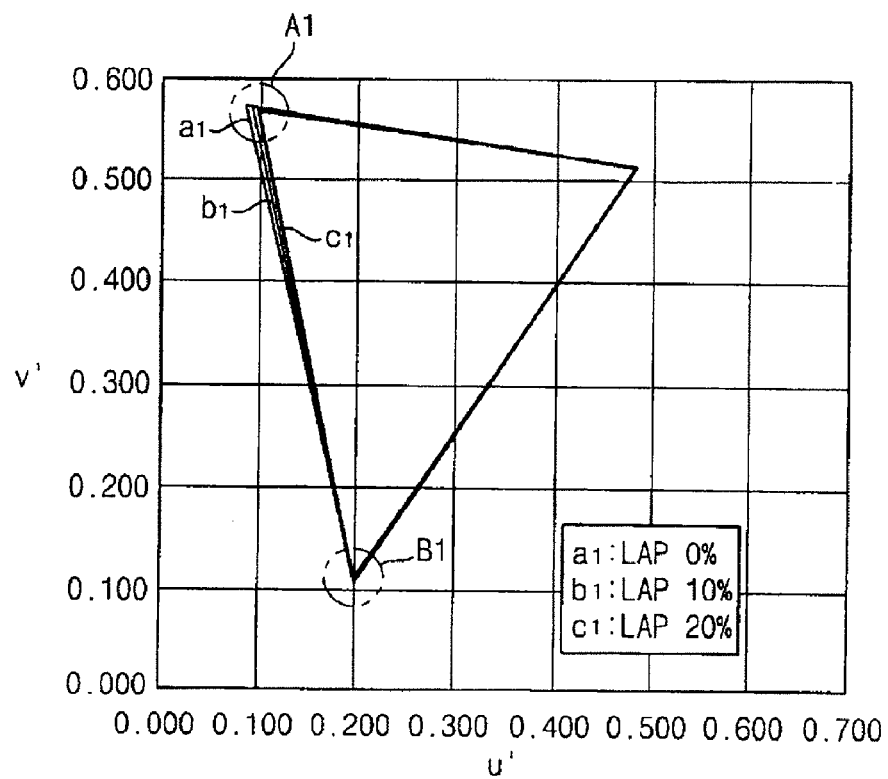
FIG. 9 is a graph illustrating a relationship between intensity and wavelength of light generated from a cold cathode fluorescent lamp including various green fluorescent mixtures in accordance with one comparative example of the present invention.

FIG. 9 is a graph illustrating a relationship between intensity and wavelength of light generated from a cold cathode fluorescent lamp including various green fluorescent mixtures in accordance with one comparative example of the present invention. The green fluorescent mixture of FIG. 9 is same as in Comparative Examples 3 to 7. Thus, any further explanation concerning the above elements will be omitted.

Referring to FIG. 9, when the green fluorescent mixture includes the BAM:Mn of about 90 wt % and the LAP of about 10 wt %, which corresponds to the graph 'a', wavelengths of first and second peaks are about 515 nm and about 545 nm, respectively, and intensities of the first and second peaks are about 2.08 a.u., and about 1.40 a.u.

When the green fluorescent mixture includes the BAM:Mn of about 70 wt % and the LAP of about 30 wt %, which corresponds to the graph 'b', wavelengths of first and second peaks are about 545 nm and about 515 nm, respectively, and intensities of the first and second peaks are about 2.10 a.u., and about 1.60 a.u.

When the green fluorescent mixture includes the BAM:Mn of about 50 wt % and the LAP of about 50 wt %, which corresponds to the graph 'c', wavelengths of first and second peaks are about 545 nm and about 515 nm, respectively, and intensities of the first and second peaks are about 2.8 a.u., and about 1.12 a.u.

When the BAM:Mn is mixed with the LAP to form the green fluorescent mixture, the maximum intensity of the green light generated from the green fluorescent mixture is decreased so that band width of the green light is increased. Also, luminance of the green light is increased. However, when the proportion of the LAP is greater than about 50 wt %, the intensity of the green light is concentrated on the wavelength of about 545 nm so that the band width of the green light becomes narrow. Thus, color reproducibility is decreased.

Figure 10:
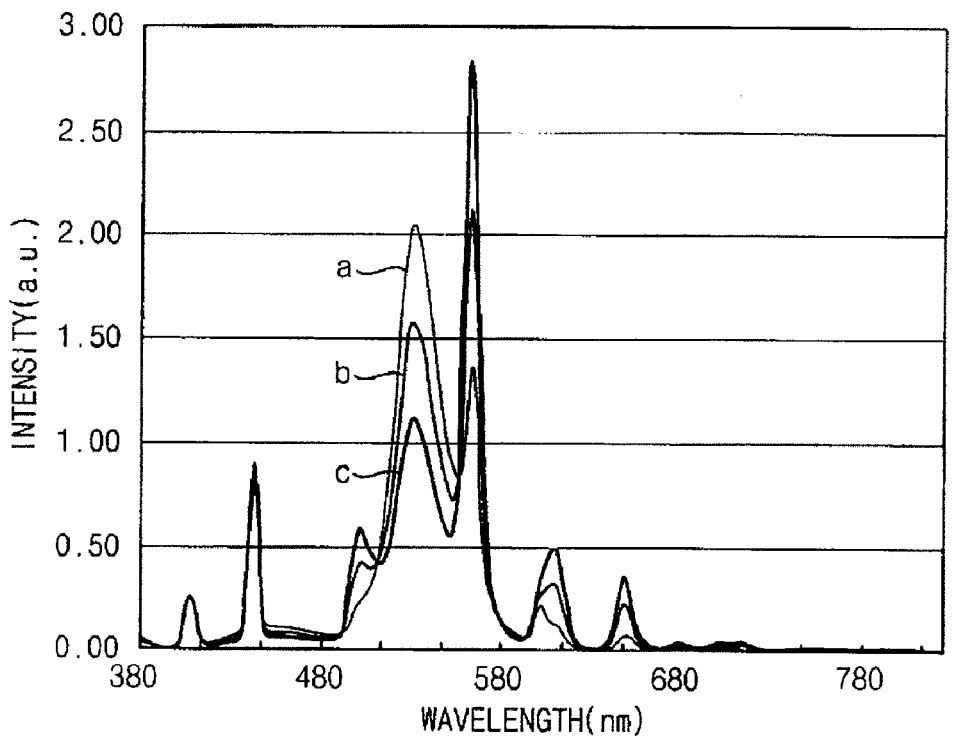
FIG. 10 is a graph illustrating a relationship between luminance and color reproducibility of a cold cathode fluorescent lamp including various green fluorescent mixtures in accordance with one comparative example of the present invention.

FIG. 10 is a graph illustrating a relationship between luminance and color reproducibility of a cold cathode fluorescent lamp including various green fluorescent mixtures in accordance with one comparative example of the present invention.

Referring to FIG. 10, when the proportion of the BAM:Mn is increased, luminance is decreased and color reproducibility is increased. However, when the proportion of the LAP is increased, the color reproducibility is decreased and the luminance is increased. When the proportion of the LAP is about 10 to about 20 wt %, the luminance and the color reproducibility of the green light are optimized.

Figure 11A:
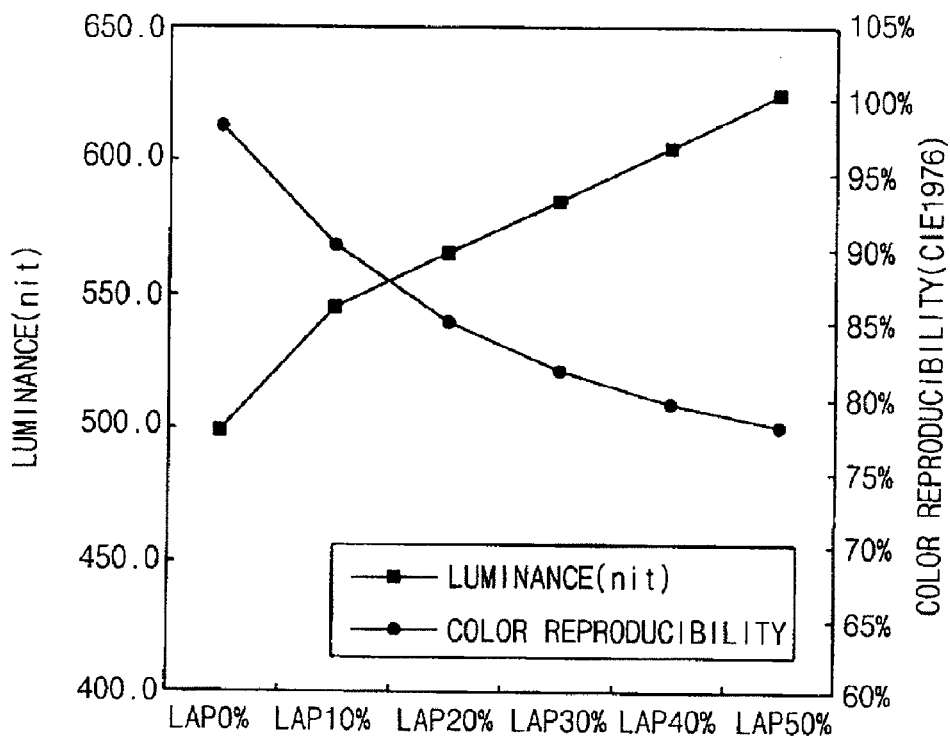
FIGS. 11A to 11C are graphs illustrating color reproducibility of red, green and blue lights, when a green fluorescent mixture includes two green fluorescent materials in accordance with one comparative example of the present invention.
Figure 11B:
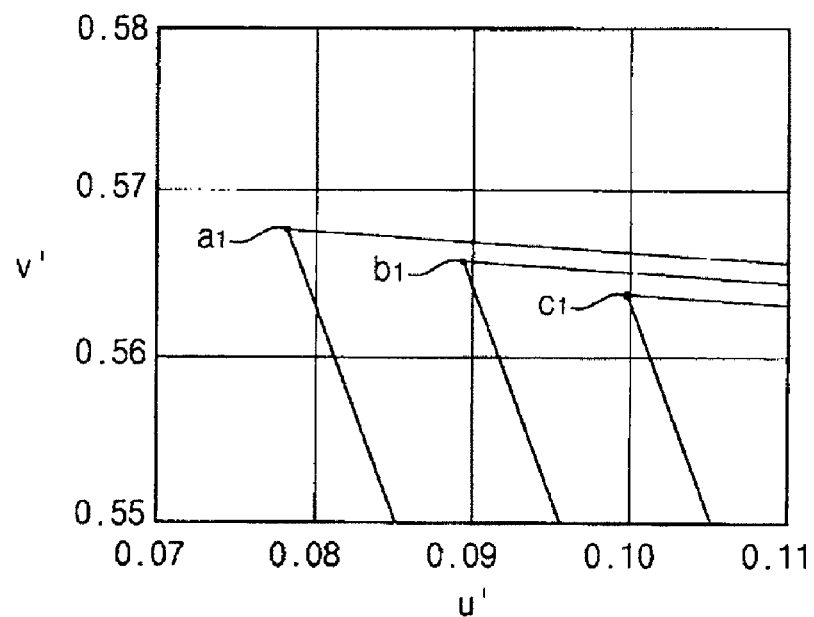
Figure 11C:
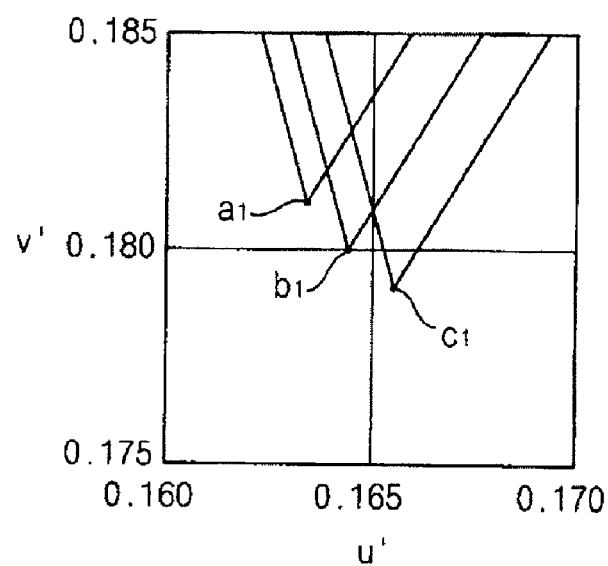

FIG. 11A is a graph illustrating color reproducibility of red, green and blue lights, when a green fluorescent mixture includes two green fluorescent materials in accordance with one comparative example of the present invention. FIG. 11B is a graph illustrating a portion 'A1' that corresponds to a green region of FIG. 11A. FIG. 11C is a graph illustrating a portion 'B1' that corresponds to a blue region of FIG. 11A.

Referring to FIGS. 11A to 11C, when a green fluorescent mixture includes LAP of about 10 wt % that corresponds to graph b1 or the LAP of about 20 wt % that corresponds to graph c1, color reproducibility of the green light is worse but color reproducibility of the blue light is better than that of the green and blue lights generated from a fluorescent mixture including pure BAM:Mn as the green fluorescent mixture.

Figure 12:
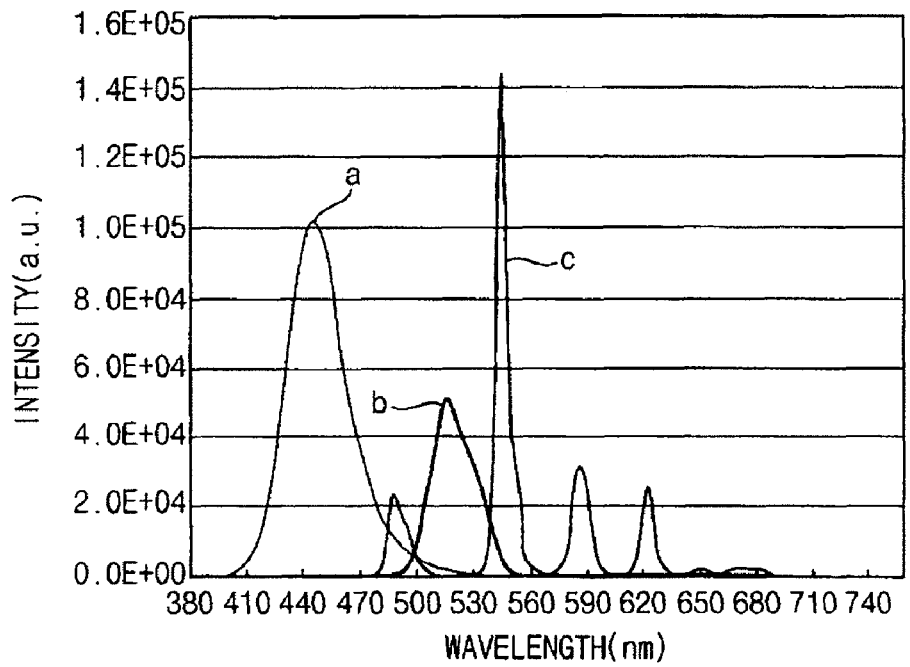
FIG. 12 is a graph illustrating a relationship between color reproducibility of blue light and a green fluorescent material in accordance with one comparative example of the present invention.

FIG. 12 is a graph illustrating a relationship between color reproducibility of blue light and a green fluorescent material in accordance with one comparative example of the present invention.

Referring to FIG. 12, when SCA is used as a blue fluorescent material for generating blue light, the blue light has a wide band width around a peak having a wavelength of about 448 nm.

When BAM:Mn is used as a green fluorescent material for generating green light, the green light has a wide band width around a peak having a wavelength of about 515 nm.

When LAP is used as the green fluorescent material for generating the green light, the green light has a maximum peak having a wavelength of about 545 nm, a second peak having a wavelength of about 576 nm and a third peak having a wavelength of about 490 nm. The third peak having the wavelength of about 490 nm may be overlapped with the band of the blue light so that the blue light may have a plurality of peaks.

Therefore, when the LAP is used as the green fluorescent material, the blue light may be disturbed, so that the color reproducibility of the blue light may be decreased.

Comparative Experiment 2

Figure 13:
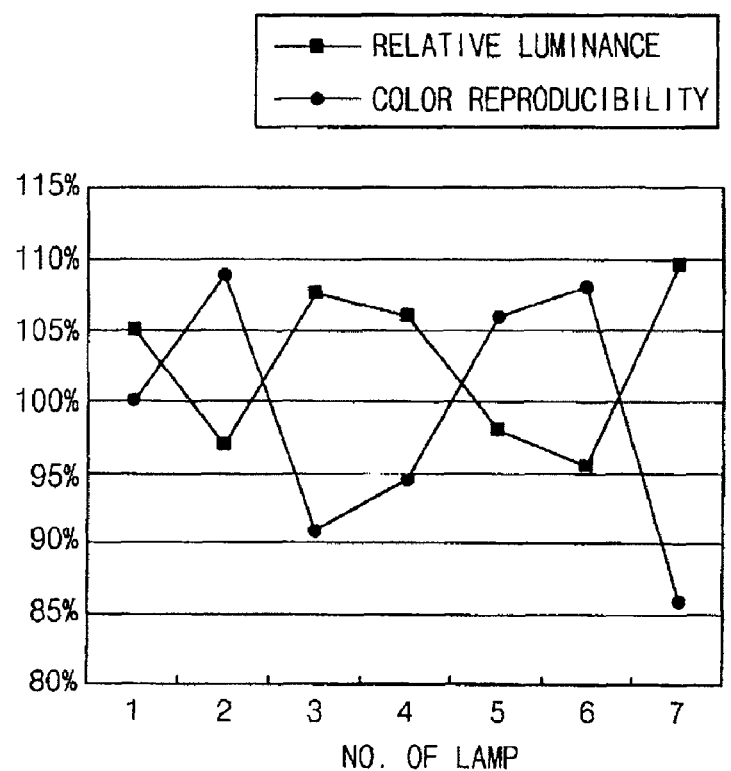
FIG. 13 is a graph illustrating a relationship between relative luminance and color reproducibility of cold cathode fluorescent lamps including various fluorescent materials in accordance with another comparative example of the present invention.

FIG. 13 is a graph illustrating a relationship between relative luminance and color reproducibility of cold cathode fluorescent lamps including various fluorescent materials in accordance with another comparative example of the present invention. In FIG. 13, a fluorescent layer of the cold cathode fluorescent lamp includes a single green fluorescent material.

The cold cathode fluorescent lamp of FIG. 13 is same as in FIG. 2 except the green fluorescent mixture. Thus, the same reference numerals will be used to refer to the same or like parts as those described in FIG. 2 and any further explanation concerning the above elements will be omitted.

Table 4 represents red, green and blue fluorescent materials used for the cold cathode fluorescent lamps of FIG. 13.

TABLE 4

| Number | Blue fluorescent material | Green fluorescent material | Red fluorescent material |
|---|---|---|---|
| 1 | SCA | BAM:Mn | YVO |
| 2 | SCA | BAM:Mn | YOX |
| 3 | SCA | CMZ | YVO |
| 4 | SCA | ZnSi | YVO |
| 5 | SCA | CMZ | YOX |
| 6 | SCA | ZnSi | YOX |
| 7 | SCA | CMZ | YOS |

Referring to FIG. 13 and Table 4, when the single green fluorescent material is used for the cold cathode fluorescent material, the color reproducibility of the cold cathode fluorescent lamp including the single green fluorescent material alternates against the luminance of the cold cathode fluorescent lamp including the single green fluorescent material. For example, the green fluorescent material of the good color reproducibility has poor or normal luminance. The green fluorescent material of the good luminance has poor or normal color reproducibility.

Figure 14:
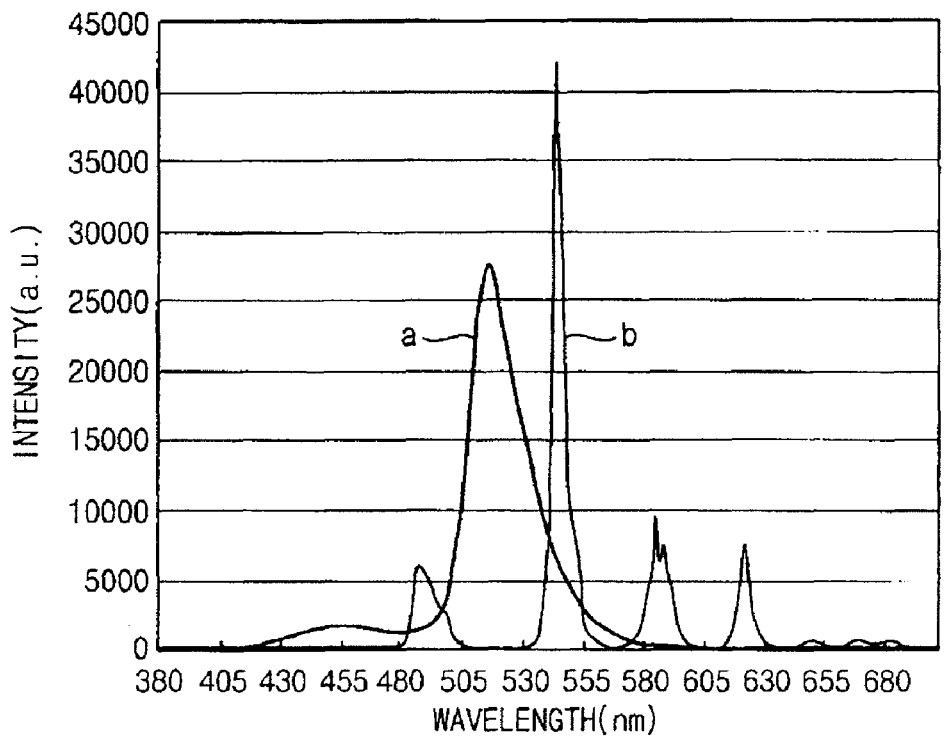
FIG. 14 is a graph illustrating a relationship between wavelength and intensity of lights having good color reproducibility and poor color reproducibility.

FIG. 14 is a graph illustrating a relationship between wavelength and intensity of lights having good color reproducibility and poor color reproducibility.

Referring to FIG. 14, the graph 'a' represents light of high color reproducibility, which has a broad band, a peak and a narrow half width (FWHM). The band is a width of a spectrum of the light. The half width is a width between wavelengths having half amplitude of the peak amplitude. When the band is narrow and the number of the peaks is increased, the color reproducibility is decreased.

Table 5 represents color reproducibility in CIE1976 color coordinate system, when a single green fluorescent material is used for a fluorescent mixture.

TABLE 5

| No. of lamp | color | fluorescent material | u' | v' | luminance | color reproducibility |
|---|---|---|---|---|---|---|
| 21 | red | YOX | 0.452 | 0.522 | 100% | 72% |
|  | green | LAP | 0.118 | 0.559 |  |  |
|  | blue | BAM | 0.167 | 0.163 |  |  |
| 22 | red | YOX | 0.470 | 0.524 | 85% | 92% |
|  | green | BAM:Mn | 0.076 | 0.567 |  |  |
|  | blue | SCA | 0.162 | 0.187 |  |  |

Figure 15:
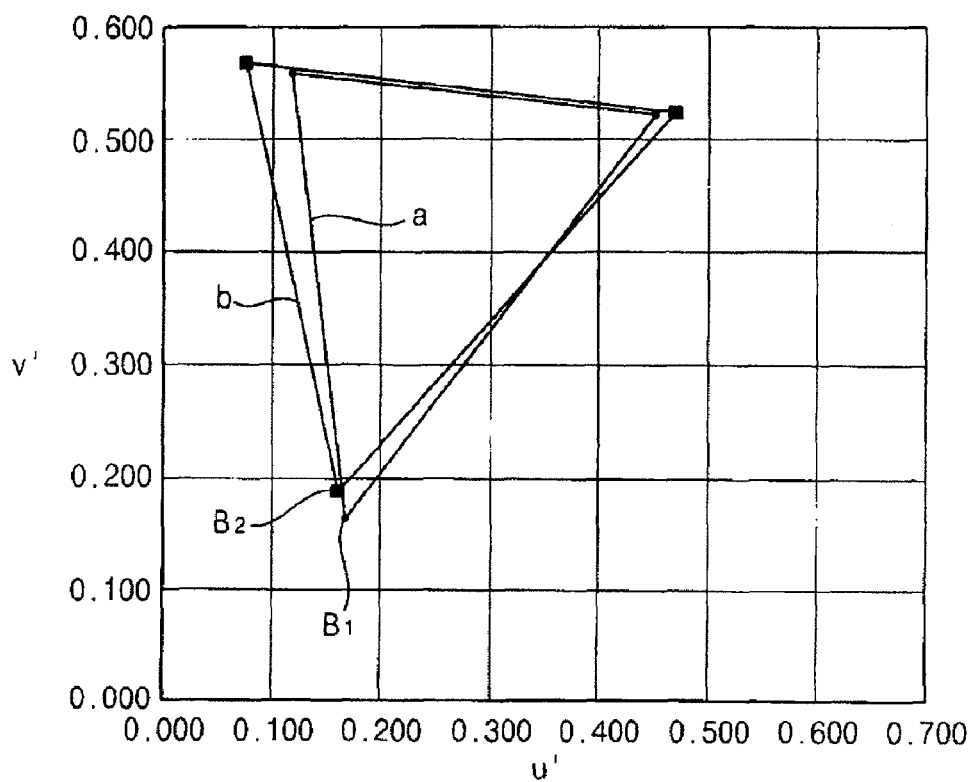
FIG. 15 is a graph illustrating color reproducibility of red, green and blue lights, when a cold cathode fluorescent lamp includes a single green fluorescent material.

FIG. 15 is a graph illustrating color reproducibility of red, green and blue lights, when a cold cathode fluorescent lamp includes a single green fluorescent material. In FIG. 15, light generated from the lamps of Table 5 is illustrated on CIE1976 color coordinate system (u', v').

Referring to Table 5 and FIG. 15, when YOX, LAP and BAM are used as the red, green and blue fluorescent materials, the color reproducibility of graph 'a' corresponding to the lamp 21 (of Table 5) of low color reproducibility is about 72%. Relative luminance of the graph 'a' is set to be 100%.

When the YOX, LAP and SCA are used as the red, green and blue fluorescent materials, the relative luminance is about 85% and the color reproducibility of graph 'b' corresponding to the lamp 22 (of Table 5) of high color reproducibility is about 92%.

The lamp of the high color reproducibility has higher color reproducibility by about 20% and lower luminance by about 15% than the lamp of the low color reproducibility. Also, in FIG. 15, the blue color B2 generated from the lamp 22 of the high color reproducibility is shifted upwardly compared with the blue color B1 generated from the lamp 21 of the low color reproducibility. Thus, the color reproducibility of the blue light is decreased.

Fluorescent Mixture for Display Device

Example 1

To manufacture a fluorescent lamp, a fluorescent mixture was coated on an inner surface of a lamp body to form a fluorescent layer. The fluorescent lamp of the present exemplary embodiment is same as in FIG. 5. Thus, the same reference numerals will be used to refer to the same or like parts as those described in FIG. 5 and any further explanation concerning the above elements will be omitted.

To prepare the fluorescent mixture, SCA of about 47 wt % as a red fluorescent material, YOX of about 31 wt % as a blue fluorescent material, and CMZ of about 22 wt % as a green fluorescent material were mixed.

In the present example, the fluorescent mixture of power were mixed and binded using a binding agent, and the mixture was coated on an inner surface of a lamp body 215 (shown in FIG. 2).

Example 2

To prepare a fluorescent mixture, SCA of about 48 wt %, YOX of about 29 wt %, and CMZ of about 22 wt % were mixed.

Example 3

To prepare a fluorescent mixture, SCA of about 45 wt %, YOX of about 29 wt %, and CMZ of about 26 wt % were mixed.

Comparative Example

To manufacture a fluorescent lamp, a fluorescent mixture was coated on an inner surface of a lamp body to form a fluorescent layer. The fluorescent lamp of the present exemplary embodiment is same as in FIG. 2. Thus, the same reference numerals will be used to refer to the same or like parts as those described in FIG. 2 and any further explanation concerning the above elements will be omitted.

To prepare the fluorescent mixture, SCA of about 47.5 g as a red fluorescent material, YOX of about 31.2 g as a blue fluorescent material, and $BaMgAl_{10}O_{17}:Eu^{2+},Mn^{2+}$ (BAM:Mn) of about 21.3 g as a green fluorescent material were mixed.

Optical Characteristics of Fluorescent Mixture

Figure 16:
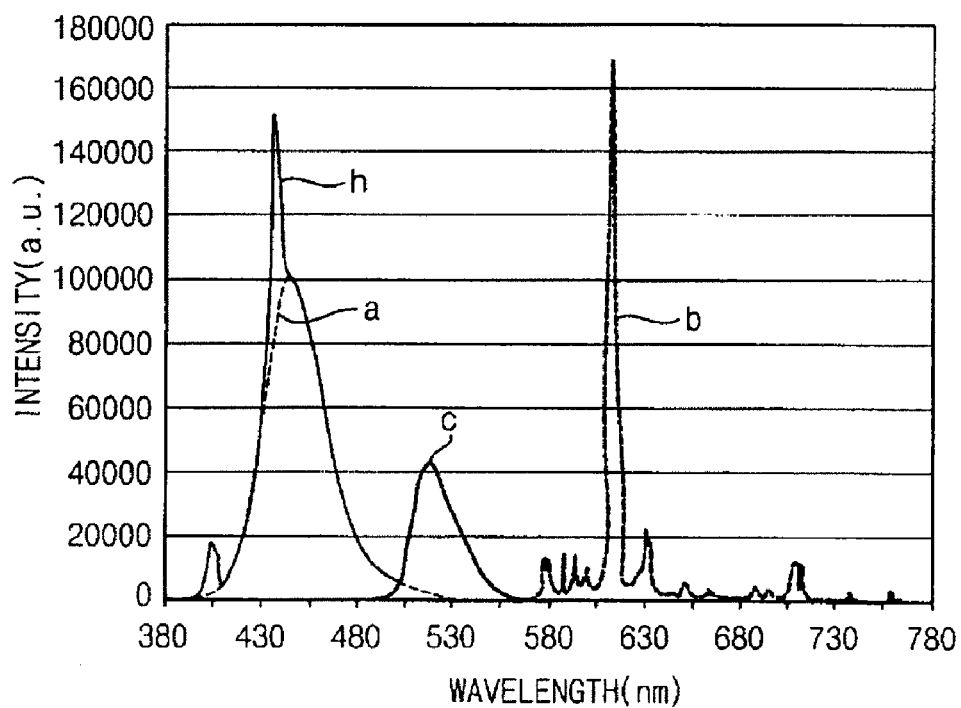
FIG. 16 is a graph illustrating optical characteristics of fluorescent materials in a fluorescent mixture in accordance with an exemplary embodiment of the present invention.

FIG. 16 is a graph illustrating optical characteristics of fluorescent materials in a fluorescent mixture in accordance with another exemplary embodiment of the present invention.

Referring to FIG. 16, light generated from a fluorescent lamp including SCA coated on an inner surface of a lamp body, which corresponds to a graph 'a', has a maximum peak of a wavelength of about 445 nm, and has a wide spectrum covering a red wavelength range.

Light generated from a fluorescent lamp including YOX coated on the inner surface of the lamp body, which corresponds to a graph 'b', has a maximum peak of a wavelength of about 612 nm, and has a spectrum including randomly distributed peaks in a blue wavelength range.

Light generated from a fluorescent lamp including CMZ coated on the inner surface of the lamp body, which corresponds to a graph 'c', has a maximum peak of a wavelength of about 517 nm, and has a wide spectrum covering a green wavelength range.

Light generated from a fluorescent lamp including a mercury gas injected in a discharge space of the lamp body, which corresponds to a graph 'h', has a maximum peak having a wavelength of about 610 nm, a second peak having a wavelength of about 436 nm and a third peak having a wavelength of about 546 nm. The maximum peak corresponds to blue light. The second peak corresponds to red light. The third peak corresponds to green light.

Figure 17:
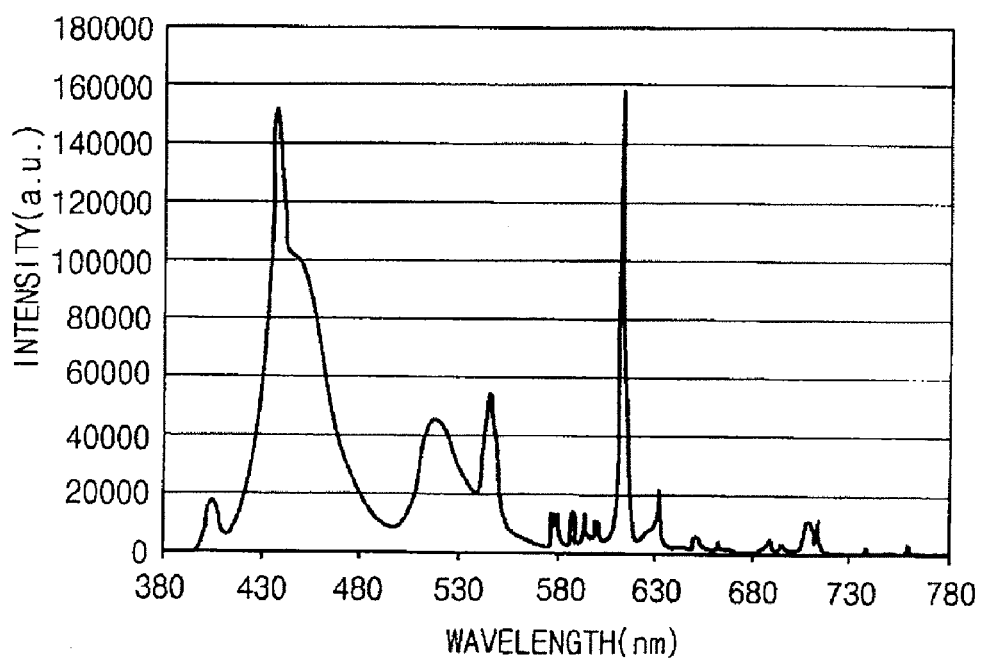
FIG. 17 is a graph illustrating optical characteristics of a fluorescent mixture including the fluorescent materials shown in FIG. 16.

FIG. 17 is a graph illustrating optical characteristics of a fluorescent mixture including the fluorescent materials shown in FIG. 16. In FIG. 17, the fluorescent mixture is prepared by mixing the SCA of 47.9 g, the YOX of 31.2 g and the CMZ of 22.4 g, and the mixture is coated on the inner surface of the lamp body 215 using a binding agent.

Referring to FIG. 17, the spectrum of the light generated from the fluorescent mixture has a peak having an intensity of about 152382 a.u. at a wavelength of about 436 nm, a peak having an intensity of about 102015 a.u. at a wavelength of about 517 nm, a peak having an intensity of about 46588 a.u. at a wavelength of about 517 nm, a peak having an intensity of about 54828 a.u. at a wavelength of about 546, and a peak having an intensity of about 158600 a.u. at a wavelength of about 612 nm.

The peaks of about 436 nm and about 445 nm are in the red wavelength range. The peaks of about 517 nm and about 546 nm are in the green wavelength range. The peak of about 612 nm is in the blue wavelength range.

The peak of about 445 nm corresponds to the light generated from the SCA, which corresponds to the graph 'a' of FIG. 16. The peak of about 517 nm corresponds to the light generated from the CMZ, which corresponds to the graph 'c' of FIG. 16. The peak of about 612 nm corresponds to the light generated from the YOX, which corresponds to the graph 'b' of FIG. 16. The peaks of about 436 nm and about 546 nm correspond to the light generated from the mercury gas, which corresponds to the graph 'h' of FIG. 16.

A ratio between the intensity of about 445 nm, the intensity of about 517 nm and the intensity of about 612 nm is about 1:0.46:1.55. In another exemplary embodiment, the ratio between the intensity of about 445 nm and the intensity of about 517 nm may be about 1:0.4 to about 1:0.5, and the ratio between the intensity of about 445 nm and the intensity of about 612 nm may be about 1:1.50 to about 1:1.60.

Figure 18:
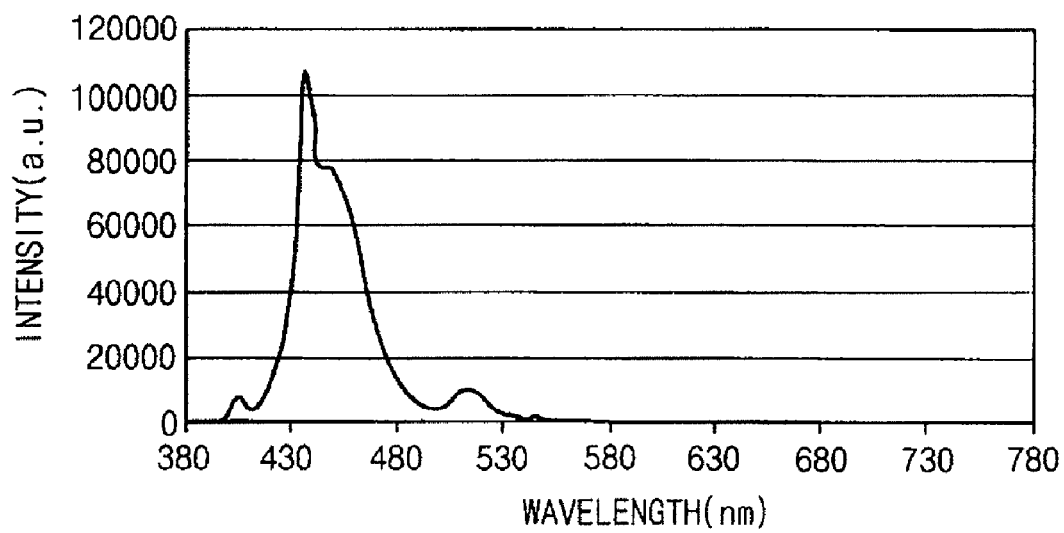
FIG. 18 is a graph illustrating optical characteristics of red light generated from the light having the spectrum of FIG. 17, which has passed through a red color filter.

FIG. 18 is a graph illustrating optical characteristics of red light generated from the light having the spectrum of FIG. 17, which has passed through a red color filter.

Referring to FIG. 18, the spectrum of the light generated from the fluorescent mixture and having passed through a red color filter has a peak having an intensity of about 107261 a.u. at a wavelength of about 436 nm, a peak having an intensity of about 77811 a.u. at a wavelength of about 445 nm. Also, the spectrum of the light having passed through the red color filter has a peak having an intensity of about 10187 a.u. at a wavelength of about 513 nm, which is adjacent to the green wavelength range. In FIG. 18, the ratio between the intensity of about 445 nm and the intensity of about 513 nm is about 1:0.131. In another exemplary embodiment, the ratio between the intensity of about 445 nm and the intensity of about 513 nm may be about 1:0.13 to about 1:0.14.

Figure 19:
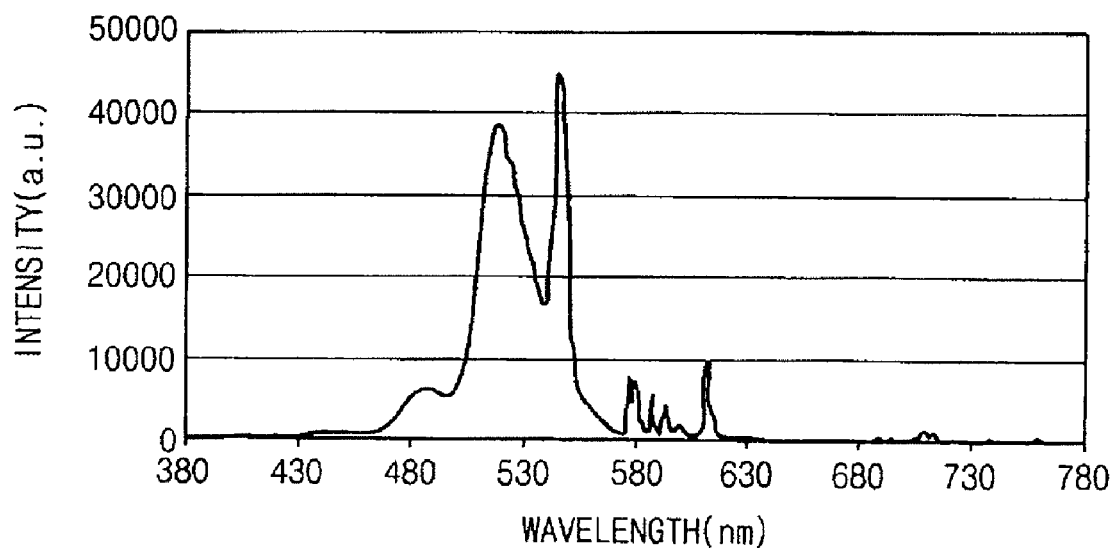
FIG. 19 is a graph illustrating optical characteristics of green light generated from the light having the spectrum of FIG. 17, which has passed through a green color filter.

FIG. 19 is a graph illustrating optical characteristics of green light generated from the light having the spectrum of FIG. 17, which has passed through a green color filter.

Referring to FIG. 19, the spectrum of the light generated from the fluorescent mixture and having passed through a green color filter has a peak having an intensity of about 38810 a.u. at a wavelength of about 517 nm, and a peak having an intensity of about 44865 a.u. at a wavelength of about 546 nm.

Figure 20:
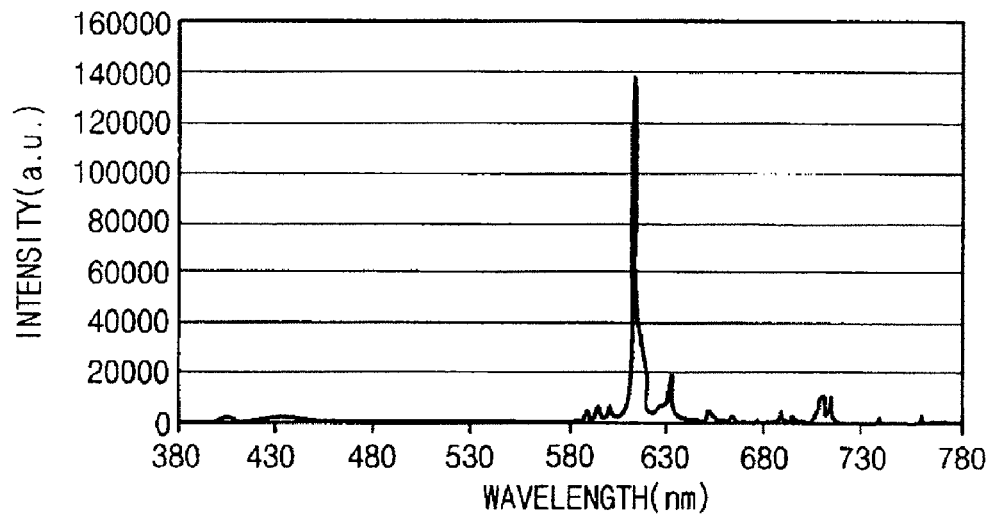
FIG. 20 is a graph illustrating optical characteristics of blue light generated from the light having the spectrum of FIG. 17, which has passed through a blue color filter.

FIG. 20 is a graph illustrating optical characteristics of blue light generated from the light having the spectrum of FIG. 17, which has passed through a blue color filter.

Referring to FIG. 20, the spectrum of the light generated from the fluorescent mixture and having passed through a blue color filter has a peak having an intensity of about 137212 a.u. at a wavelength of about 612 nm.

Table 6 represents color coordinates of light generated from a fluorescent mixture in accordance with an exemplary embodiment of the present invention. In Table 6, the fluorescent mixture including SCA, YOX and CMZ, which corresponds to example 1, and the fluorescent mixture including SCA, YOX and BAM:Mn, which corresponds to comparative example are tested.

TABLE 6

| fluorescent mixture | color coordinates (ux, uy) | | |
|---|---|---|---|
| | red | blue | Green |
| SCA-YOX-BAM:Mn | (0.6501, 0.3265) | (0.1486, 0.0705) | (0.2178, 0.6772) |
| SCA-YOX-CMZ | (0.6494, 0.3267) | (0.1501, 0.0650) | (0.2311, 0.6773) |

Figure 21:
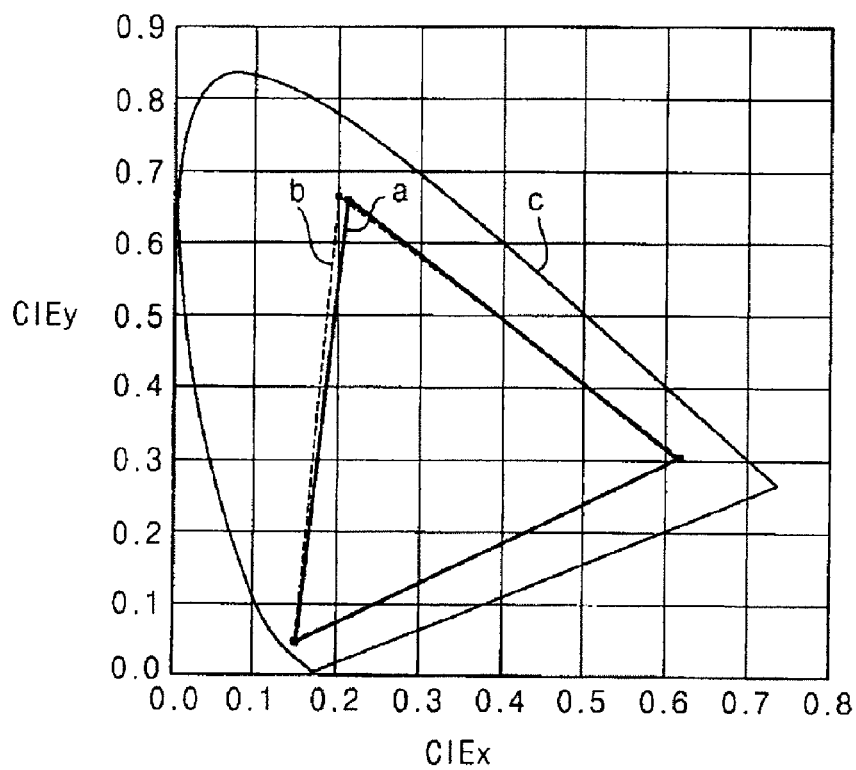
FIG. 21 is a graph illustrating a relationship between the light having the spectrum of FIG. 17 and light of a comparative embodiment with reference to CIE1931 color coordinate system.

FIG. 21 is a graph illustrating a relationship between the light having the spectrum of FIG. 17 and light of a comparative embodiment with reference to CIE1931 color coordinate system.

Referring to FIG. 21 and Table 6, the color reproducibility 'a' of red, blue and green lights generated from the fluorescent mixture including the SCA, the YOX and the CMZ is substantially the same as the color reproducibility 'b' of red, blue and green lights generated from the fluorescent mixture including the SCA, the YOX and the BAM:Mn.

When the CMZ corresponding to the graph 'a' is used as a green fluorescent material of the fluorescent mixture, the color coordinates of the red, green and blue lights are about (0.6494, 0.3267), about (0.1501, 0.0650) and about (0.2311, 0.6773) with respect to the CIE1931 color coordinate system 'c', respectively. Alternatively, the color coordinates of the red light may be about (0.64, 0.32) to about (0.65, 0.33), the color coordinates of the blue light may be about (0.15, 0.06) to about (0.16, 0.07), and the color coordinates of the green light may be about (0.23, 0.67) to about (0.24, 0.68) with respect to the CIE1931 color coordinate system 'c'.

Table 7 represents luminance, color reproducibility and white color coordinates of the light generated from the fluorescent mixture of Table 6. In Table 7, the luminance is relatively determined with respect to the comparative example, and the white color coordinates is color coordinates of white light generated by mixing the red, green and blue lights generated from the fluorescent mixture.

TABLE 7

| fluorescent mixture | luminance | color reproducibility | white color coordinates |
|---|---|---|---|
| SCA-YOX-BAM:Mn | 100.0% | 90.6% | (0.2763, 0.2811) |
| SCA-YOX-CMZ | 91.9% | 89.9% | (0.2949, 0.2924) |

Referring to Table 7, the white color coordinates of the white light generated by mixing the red, green and blue lights is about (0.2949, 0.2924). The luminance of the white light generated from the fluorescent mixture including the CMZ as the green fluorescent material has smaller luminance than the luminance of the white light generated from the fluorescent mixture including the BAM:Mn as the green fluorescent material. However, the white light generated from the fluorescent mixture including the CMZ as the green fluorescent material has substantially the same color reproducibility and the white color coordinates as the luminance of the white light generated from the fluorescent mixture including the BAM:Mn as the green fluorescent material. Alternatively, the white color coordinates of the white light may be about (0.29, 0.29) to about (0.30, 0.30).

In accordance with exemplary embodiments of the present invention, a fluorescent lamp, a backlight assembly having the fluorescent lamp and a display device having the fluorescent lamp, the fluorescent lamp, in which green light is a critical color of luminance compared with red light or blue light, includes a fluorescent layer having a main green fluorescent material, a first sub-green fluorescent material and a second sub-green fluorescent material. Thus, the luminance of the fluorescent lamp of exemplary embodiments of the present invention may be increased, although color reproducibility may not be decreased. In addition, the ratio between the main green fluorescent material, the first sub-green fluorescent material and the second sub-green fluorescent material is adjusted to optimize the color reproducibility and luminance of the backlight assembly.

Furthermore, the green light generated from the green fluorescent mixture does may not emit light having a blue wavelength, so that the color reproducibility of the blue light may not be deteriorated.

Also, as CMZ is used as the green fluorescent material, the color purity of the light generated from the fluorescent mixture including the CMZ may be improved. In addition, disturbance between the green and blue lights that have similar wavelength range or between the red and green lights that have similar wavelength range may be decreased, so that the color purity of the red, green and blue lights is improved. Thus, the color reproducibility and the image display quality of the display device may be improved.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A fluorescent mixture comprising:
   $(Sr,Ca,Ba,Mg)_5(PO_4)_3Cl:Eu^{2+}$(SCA) present in an amount of about 45 to about 50 wt %;
   $Y_2O_3:Eu^{3+}$(YOX) present in an amount of about 29 to about 33 wt %; and
   a green fluorescent having a main green fluorescent and at least one sub green fluorescent, wherein the sum of the main green fluorescent and the at least one sub green fluorescent is present in an amount of about 20 to about 26 wt %.

2. The fluorescent mixture of claim 1, wherein the main green fluorescent comprises $BaMgAl_{10}O_{17}:Eu^{2+}, Mn^{2+}$ (BAM:Mn).

3. The fluorescent mixture of claim 2, wherein the at least one sub green fluorescent comprises one of $(Ce,Mg,Zn)Al_{11}O_{19}:Mn^{2+}$(CMZ) and $LaPO_4:Ce^{3+},Tb^{3+}$(LAP).

4. The fluorescent mixture of claim 2, wherein the at least one sub green fluorescent comprises $(Ce,Mg,Zn)Al_{11}O_{19}:Mn^{2+}$(CMZ) and $LaPO_4:Ce^{3+},Tb^{3+}$(LAP).

5. A fluorescent lamp comprising:
a lamp body having a discharge space in which ultraviolet light is generated;
a fluorescent layer formed on an inner surface of the lamp body to change the ultraviolet light into visible light, the fluorescent layer including a fluorescent mixture comprising $(Sr,Ca,Ba,Mg)_5(PO_4)_3Cl:Eu^{2+}$(SCA) present in an amount of about 45 to about 50 wt %, $Y_2O_3:Eu^{3+}$ (YOX) present in an amount of about 29 to about 33 wt % and a green fluorescent having a main green fluorescent and at least one sub green fluorescent, wherein the sum of the main green fluorescent and the at least one sub green fluorescent is present in an amount of about 20 to about 26 wt %; and
a discharge electrode on an end portion of the lamp body to apply a voltage to the discharge space.

6. The fluorescent lamp of claim 5, wherein the main green fluorescent comprises $BaMgAl_{10}O_{17}:Eu^{2+},Mn^{2}\pm$(BAM:Mn).

7. The fluorescent lamp of claim 6, wherein the at least one sub green fluorescent comprises one of $(Ce,Mg,Zn)Al_{11}O_{19}:Mn^{2+}$(CMZ) and $LaPO_4:Ce^{3+},Tb^{3+}$(LAP).

8. The fluorescent lamp of claim 6,
wherein the at least one sub green fluorescent comprises $(Ce,Mg,Zn)Al_{11}O_{19}:Mn^{2+}$(CMZ) and $LaPO_4:Ce^{3+},Tb^{3+}$(LAP).

9. The fluorescent lamp of claim 8, wherein the BAM:Mn is present in an amount of about 65 to about 85 wt %, the LAP is present in an amount of about 10 to about 20 wt %, the CMZ is present in an amount of about 5 to about 15 wt % among the sum of the main green fluorescent and the at least one sub green fluorescent.

10. The fluorescent lamp of claim 8, wherein the BAM:Mn is present in an amount of about 75 wt %, the LAP is present in an amount of about 15 wt %, the CMZ is present in an amount of about 10 wt % among the sum of the main green fluorescent and the at least one sub green fluorescent.

* * * * *